(12) United States Patent
Labbe et al.

(10) Patent No.: US 10,730,576 B2
(45) Date of Patent: Aug. 4, 2020

(54) FLAP ASSEMBLY FOR A SNOWMOBILE

(71) Applicant: BOMBARDIER RECREATIONAL PRODUCTS INC., Valcourt (CA)

(72) Inventors: Christian Labbe, Sherbrooke (CA); Mathieu Mercier, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 144 days.

(21) Appl. No.: 15/804,636

(22) Filed: Nov. 6, 2017

(65) Prior Publication Data
US 2018/0178869 A1    Jun. 28, 2018

Related U.S. Application Data

(60) Provisional application No. 62/438,191, filed on Dec. 22, 2016.

(51) Int. Cl.
*B62J 15/02* (2006.01)
*B62M 27/02* (2006.01)
(Continued)

(52) U.S. Cl.
CPC ................. *B62J 15/02* (2013.01); *B62J 9/20* (2020.02); *B62J 11/00* (2013.01); *B62J 15/04* (2013.01);
(Continued)

(58) Field of Classification Search
CPC ....................................................... B62J 15/04
See application file for complete search history.

(56) References Cited

U.S. PATENT DOCUMENTS 6,491,125 B2 * 12/2002 Girouard .................. B62J 35/00
180/190
6,823,957 B2 * 11/2004 Girouard .................. B62J 35/00
180/190
(Continued)

FOREIGN PATENT DOCUMENTS

WO    2012002959 A1    1/2012
WO    2013149028 A1    10/2013

OTHER PUBLICATIONS

Slydog Skis; Slydog Shovel Flap; retrieved from https://slydogskis.com/shop/product/slydog-snow-flap/ on Jun. 21, 2017.

*Primary Examiner* — Jacob D Knutson
*Assistant Examiner* — Harold Eric Pahlck, III
(74) *Attorney, Agent, or Firm* — BCF LLP

(57) ABSTRACT

There is provided a snowmobile that has a frame having a longitudinally extending tunnel, a steering assembly operatively connected to the frame, at least one ski operatively connected to the frame and to the steering assembly, an endless drive track operatively connected to the frame, a motor supported by the frame and is operatively connected to the steering assembly and to the endless drive track for propelling the snowmobile, a straddle-type seat disposed above the tunnel and adapted to accommodate a rider, and a flap assembly. The flap assembly has a flap, a mounting body connected to a rear portion of the tunnel, and at least one toolless fastener extending generally longitudinally and selectively connecting the flap to the mounting body. There is also provided a flap assembly kit for a snowmobile and a method for installing a flap on a rear portion of a tunnel of a snowmobile.

17 Claims, 21 Drawing Sheets

(51) Int. Cl.
 *B62J 15/04* (2006.01)
 *B62J 11/00* (2020.01)
 *B62J 9/20* (2020.01)

(52) U.S. Cl.
 CPC ....... *B62M 27/02* (2013.01); *B62M 2027/025* (2013.01); *B62M 2027/027* (2013.01); *B62M 2027/028* (2013.01)

(56) References Cited

U.S. PATENT DOCUMENTS

| | | | | |
|---|---|---|---|---|
| 7,328,765 | B2 * | 2/2008 | Ebert | B62D 25/161 |
| | | | | 180/186 |
| 7,779,944 | B2 * | 8/2010 | Bergman | B60K 11/04 |
| | | | | 180/190 |
| 8,225,896 | B2 * | 7/2012 | Eichenberger | B60K 28/00 |
| | | | | 180/190 |
| 8,490,731 | B2 * | 7/2013 | Eaton | B60K 28/00 |
| | | | | 180/190 |
| 8,550,514 | B2 * | 10/2013 | Huntimer | E01H 5/068 |
| | | | | 294/51 |
| 8,567,546 | B2 * | 10/2013 | Berg | B60K 11/04 |
| | | | | 180/190 |
| 8,590,654 | B2 * | 11/2013 | Kerner | B60K 28/00 |
| | | | | 180/190 |
| 9,446,810 | B2 * | 9/2016 | Ripley | B62J 25/00 |
| 9,751,592 | B2 | 9/2017 | Labbe et al. | |
| 9,845,004 | B2 * | 12/2017 | Hedlund | B60K 13/04 |
| 2016/0194021 | A1 | 7/2016 | Vezina et al. | |

\* cited by examiner

FLAP ASSEMBLY FOR A SNOWMOBILE

CROSS-REFERENCE

The present application claims priority to U.S. Provisional Patent Application No. 62/438,191, filed Dec. 22, 2016, entitled "A FLAP ASSEMBLY FOR A SNOWMOBILE", the entirety of which is incorporated herein.

TECHNICAL FIELD

The present technology relates to flap assemblies for snowmobiles.

BACKGROUND

Snowmobiles are designed to operate on different kinds of ice and snow-covered surfaces. A snowmobile is commonly provided with a flap to help block some of the snow being projected rearward and upward by the track of the snowmobile during its operation and/or to aid cooling of the snowmobile by redirecting the projected snow onto a heat exchanger of the snowmobile.

A snowmobile traveling on deep soft snow sometimes trenches itself when the tracks start to dig in the snow. This effect is sometimes referred to as trenching. Once the snow flap begins to contact the snow, at least some weight of the snowmobile is transferred from the tracks to the snow flap. This is sometimes referred to as jacking. This results in decreased traction of the track with the snow, which may lead to the snowmobile getting stuck in the trench dug in the snow by the track. Sometimes, when the snowmobile is reversing in deep snow, the snow flap is pushed by the snow at the rear of the snowmobile towards the track and this may lead to the snow flap getting caught under the track.

SUMMARY

One object of the present is to ameliorate at least some of the inconveniences of the prior art.

In some implementations of the present technology, there is provided a snowmobile that has a frame which has a longitudinally extending tunnel, a steering assembly operatively connected to the frame, at least one ski operatively connected to the frame and to the steering assembly, an endless drive track operatively connected to the frame, and a motor supported by the frame. The motor is operatively connected to the steering assembly and to the endless drive track for propelling the snowmobile. The snowmobile also has a straddle-type seat disposed above the tunnel and adapted to accommodate a rider. The snowmobile also has a flap assembly. The flap assembly has a flap, a mounting body connected to a rear portion of the tunnel and at least one toolless fastener that extends generally longitudinally and selectively connects the flap to the mounting body.

In some implementations of the snowmobile, the at least one toolless fastener includes at least one anchor selectively cooperating with at least one aperture defined in the mounting body in order to connect the flap to the mounting body.

In some implementations of the snowmobile, the at least one anchor is selectively pivoted about a generally longitudinal axis for cooperating with the at least one aperture.

In some implementations of the snowmobile, the flap extends generally downward from the mounting body when the flap is connected to the mounting body.

In some implementations of the snowmobile, the flap extends at least partially rearward of the endless drive track when the flap is connected to the mounting body.

In some implementations of the snowmobile, the flap assembly further has a linking body. The flap is connected to the linking body and the at least one toolless fastener selectively connects the linking body to the mounting body.

In some implementations of the snowmobile, the linking body has inner recesses and the flap is at least partially inserted in the inner recesses.

In some implementations of the snowmobile, the flap is fastened to the linking body.

In some implementations of the snowmobile, one of the linking body and the mounting body has at least one tongue and an other one of the linking body and the mounting body defines at least one groove. The at least one tongue is received in the at least one groove when the linking body is connected to the mounting body.

In some implementations of the snowmobile, the flap assembly further has a linking body. The flap is connected to the linking body and the at least one anchor is pivotally connected to the linking body.

In some implementations of the snowmobile, the at least one toolless fastener selectively connects the flap to one of the mounting body and a top side of the tunnel.

In some implementations of the snowmobile, the flap extends at least partially rearward of the tunnel when the flap is connected to the top side of the tunnel.

In some implementations of the snowmobile, the at least one toolless fastener is two toolless fasteners that selectively connect the flap to opposite sides of a lateral center of the mounting body.

In some implementations of the present technology, there is provided a flap assembly kit for a snowmobile. The kit has a mounting body adapted for connecting to a rear portion of the snowmobile, a linking body adapted for connecting to a flap and at least one toolless fastener that selectively connects the linking body to the mounting body.

In some implementations of the kit, the at least one toolless fastener includes at least one anchor adapted for selectively cooperating with at least one aperture defined in one of the linking body and the mounting body to connect the linking body to the mounting body.

In some implementations of the kit, the kit further has a flap connected to the linking body.

In some implementations of the kit, the linking body has inner recesses adapted for receiving a portion of the flap therein.

In some implementations of the kit, one of the linking body and the mounting body has at least one tongue and an other one of the linking body and the mounting body defines at least one groove. The at least one tongue is received in the at least one groove when the linking body is connected to the mounting body.

In some implementations of the present technology, there is provided a method for installing a flap on a rear portion of a tunnel of a snowmobile. The method has the step of abutting a linking body against a mounting body. The linking body is connected to the flap and the flap extends from the linking body. The mounting body is mounted to the rear portion of the tunnel. The method also has the step of fastening the linking body to the mounting body using at least one toolless fastener.

In some implementations of the method, the step of abutting the linking body against the mounting body includes inserting at least one tongue of the linking body into at least one groove defined in the mounting body. The step of abutting the linking body against the mounting body also includes pivoting the linking body towards the mounting body.

In some implementations of the method, the step of fastening the linking body to the mounting body using at least one toolless fastener includes inserting an anchor of the at least one toolless fastener into at least one aperture defined in the mounting body. The step of fastening the linking body to the mounting body using at least one toolless fastener also includes turning the anchor of the at least one toolless fastener once the anchor is inserted in the at least one aperture.

In some implementations of the present technology, there is provided a snowmobile that has a frame which has a longitudinally extending tunnel, a steering assembly operatively connected to the frame, at least one ski operatively connected to the frame and to the steering assembly, an endless drive track operatively connected to the frame, and a motor supported by the frame. The motor is operatively connected to the steering assembly and to the endless drive track for propelling the snowmobile. The snowmobile also has a straddle-type seat disposed above the tunnel and adapted to accommodate a rider. The snowmobile also has a flap selectively and removably connected to the snowmobile by at least one toolless fastener in any one of at least two distinct positions on the snowmobile, at least one of the at least two distinct positions being on a rear portion of the tunnel.

In some implementations of the snowmobile, the snowmobile further has a flap assembly. The flap assembly has a flap, a mounting body connected to the rear portion of the tunnel, and the at least one toolless fastener selectively connecting the flap to the mounting body in one of the at least two distinct positions.

In some implementations of the snowmobile, the at least two distinct positions include a guard position of the flap and a stored position of the flap, the guard position being on the rear portion of the tunnel.

In some implementations of the snowmobile, the flap is in the stored position when the flap is connected to a top side of the tunnel.

In some implementations of the snowmobile, the snowmobile has a bag. The bag has a body which has a top portion and a bottom portion which define a storage space therebetween. The top portion is connected to the bottom portion. The top portion is adapted for selectively and removably connecting the flap on top of the top portion. The bottom portion has at least one other toolless fastener selectively and removably connecting the bottom portion to the rear portion of the tunnel.

In some implementations of the snowmobile, the snowmobile has two snowmobile connection bodies connected to the rear portion of the tunnel. Each one of the two snowmobile connection bodies has a respective top aperture. The at least one other toolless fastener of the bottom portion is two other toolless fasteners each having a respective other anchor cooperating with a respective one of the two snowmobile connection bodies. The at least one toolless fastener is two toolless fasteners each having a respective anchor. The top portion has two connection bodies for selectively cooperating with a respective one of the two toolless fasteners. Each one of the two connection bodies has a respective top aperture. A lateral distance separating the anchors is same as (i) a lateral distance separating the other anchors, (ii) a lateral distance separating the top apertures of the snowmobile connection bodies and (iii) a lateral distance separating the top apertures of the connection bodies of the top portion.

In some implementations of the snowmobile, the snowmobile has two snowmobile connection bodies connected to the rear portion of the tunnel. Each one of the two snowmobile connection bodies has a respective top aperture and a respective inwardly facing aperture. A lateral distance separating the top apertures of the two snowmobile connection bodies is longer than a lateral distance separating the inwardly facing apertures. The at least one other toolless fastener of the bottom portion is one toolless fastener that has an other anchor cooperating with one of two snowmobile connection bodies. The bottom portion further has a toe cooperating with another one of the two snowmobile connection bodies. The at least one toolless fastener is two toolless fasteners each having a respective anchor. The top portion has two connection bodies for selectively cooperating with a respective one of the two toolless fasteners. Each one of the two connection bodies has a respective top aperture. A lateral distance separating the other anchor and the toe is shorter than (i) a lateral distance separating the anchors, (ii) the lateral distance separating the top apertures of the snowmobile connection bodies and (iii) a lateral distance separating the top apertures of the connection bodies of the top portion, which allows a selective and removable connection of the bag with the snowmobile connection bodies.

In some implementations of the present technology, there is provided a snow-flap assembly for a snowmobile. The snow-flap assembly has a snow-flap and at least one toolless fastener. The at least one toolless fastener is connected to the snow-flap. The at least one toolless fastener is adapted for selectively removably connecting the snow-flap to the snowmobile in any one of at least two distinct positions on the snowmobile.

In some implementations of the snow-flap assembly, the snow-flap assembly further has a mounting body adapted for connecting to a rear portion of a tunnel of the snowmobile, the at least one toolless fastener being adapted for selectively and removably connecting the snow-flap to the mounting body in at least one of the at least two distinct positions.

In some implementations of the snow-flap assembly, the at least two distinct positions include a guard position of the snow-flap and a stored position of the snow-flap. When the snow-flap is connected to the snowmobile in the guard position, the snow-flap is selectively and removably connected to the mounting body.

In some implementations of the snow-flap assembly, when the snow-flap is connected to the snowmobile in the stored position, the snow-flap is selectively and removably connected to a top side of the tunnel.

In some implementations of the snow-flap assembly, when the snow-flap is connected to the snowmobile in the guard position, the snow-flap extends at least partially downward of the tunnel. When the snow-flap is connected to the snowmobile in the stored position, the snow-flap extends above the tunnel.

In some implementations of the snow-flap assembly, at least one of the at least two distinct positions is on top of a bag of the snowmobile. The bag comprises a body having a top portion and a bottom portion which define a storage space therebetween. The top portion is connected to the bottom portion. The top portion is adapted for cooperating with the at least one toolless fastener of the snow-flap assembly. The bottom portion having at least one other toolless fastener which selectively and removably connects the bottom portion to a rear portion of the snowmobile.

In some implementations of the present technology, there is provided a method for installing a flap on a snowmobile by a flap assembly kit. The snowmobile has a frame that has a longitudinally extending tunnel, a steering assembly operatively connected to the frame, at least one ski operatively connected to the frame and to the steering assembly, an endless drive track operatively connected to the frame, a motor supported by the frame where the motor is operatively connected to the steering assembly and to the endless drive track for propelling the snowmobile, a straddle-type seat disposed above the tunnel and adapted to accommodate a rider, and the flap connected to the tunnel. The flap assembly kit has a mounting body adapted for connecting to the tunnel, a linking body adapted for connecting a lower portion of the flap, and at least one toolless fastener for selectively and removably connecting the linking body to the mounting body. The method has the steps of removing the flap from the tunnel, separating the flap into an upper portion of the flap and the lower portion of the flap, connecting the lower portion of the flap to the linking body, connecting the mounting body to the tunnel. The method also has the step of selectively and removably connecting the linking body and the lower portion of the flap to the mounting body by the at least one toolless fastener.

In some implementations of the present technology, there is provided a method for installing a flap on a snowmobile. The snowmobile has a frame that has a longitudinally extending tunnel, a steering assembly operatively connected to the frame, at least one ski operatively connected to the frame and to the steering assembly, an endless drive track operatively connected to the frame, a motor supported by the frame, the motor being operatively connected to the steering assembly and to the endless drive track for propelling the snowmobile and a straddle-type seat disposed above the tunnel and adapted to accommodate a rider. The method has the step of selectively and removably connecting the flap to the snowmobile by at least one toolless fastener in a first position on the snowmobile. The first position is on a rear portion of the tunnel. The method has the step of disconnecting and removing the flap from the tunnel and the step of selectively and removably connecting the flap to the snowmobile by the at least one toolless fastener in a second position on the snowmobile. The second position is distinct from the first position.

In some implementations of the method, the method further comprises selectively and removably connecting a bag to the tunnel by at least one other toolless fastener. Also, selectively and removably connecting the flap to the snowmobile by the at least one toolless fastener in the second position on the snowmobile comprises selectively and removably connecting the flap to the bag by the at least one toolless fastener.

In some implementation of the present technology, there is provided a bag for a snowmobile. The bag has a body having a top portion and a bottom portion that define a storage space therebetween. The top portion is connected to the bottom portion. The top portion is adapted for selectively and removably connecting a snow flap on top of the top portion. The bottom portion has at least one toolless fastener for selectively and removably connecting the bottom portion to a rear portion of the snowmobile.

In some implementations of the bag, the top portion is selectively connected to the bottom portion In some implementations of the bag, the top portion is adapted for selectively and removably retaining a shovel on top of the top portion.

In some implementations of the bag, the top portion has at least one connection body for selectively cooperating with at least one other toolless fastener of a flap assembly having the snow flap for selectively and removably connecting the snow flap on top of the top portion.

In some implementations of the bag, the at least one toolless fastener of the bottom portion is two toolless fasteners each having a respective anchor. The at least one other toolless fastener of the flap assembly is two other toolless fasteners each having a respective other anchor. The at least one connection body of the top portion is two connection bodies for selectively cooperating with the other anchors. Each one of the two connection bodies has a respective top aperture. A lateral distance separating the anchors is same as (i) a lateral distance separating the other anchors and (ii) a lateral distance separating the top apertures of the connection bodies of the top portion.

In some implementations of the bag, the at least one toolless fastener of the bottom portion is one toolless fastener having an anchor. The bottom portion also has a toe. The at least one other toolless fastener of the flap assembly is two other toolless fasteners each having a respective other anchor. The at least one connection body of the top portion is two connection bodies for selectively cooperating with the other anchors. Each one of the two connection bodies has a respective top aperture. A lateral distance separating the anchor and the toe is shorter than (i) a lateral distance separating the other anchors and (ii) a lateral distance separating the top apertures of the connection bodies of the top portion, so as to allow a selective and removable connection of the bag with the rear portion of the snowmobile.

In some implementations of the present technology, there is provided a snowmobile accessory assembly. The snowmobile accessory assembly has a bag that has a body. The body has a top portion and a bottom portion that define a storage space therebetween. The top portion is connected to the bottom portion. The bottom portion has at least one toolless fastener for selectively and removably connecting the bottom portion to a rear portion of a snowmobile. The snowmobile accessory assembly also has a flap assembly that has a snow flap and at least one other toolless fastener. The at least one other toolless fastener selectively and removably connects the flap on top of the top portion. The snowmobile accessory assembly also has a shovel selectively and removably retained on top of the top portion and at least partially located between the flap and the top portion.

For purposes of this application, terms related to spatial orientation such as forwardly, rearwardly, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as the ice scratcher for example, should be understood as they would be understood when these components or sub-assemblies are mounted to the vehicle.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
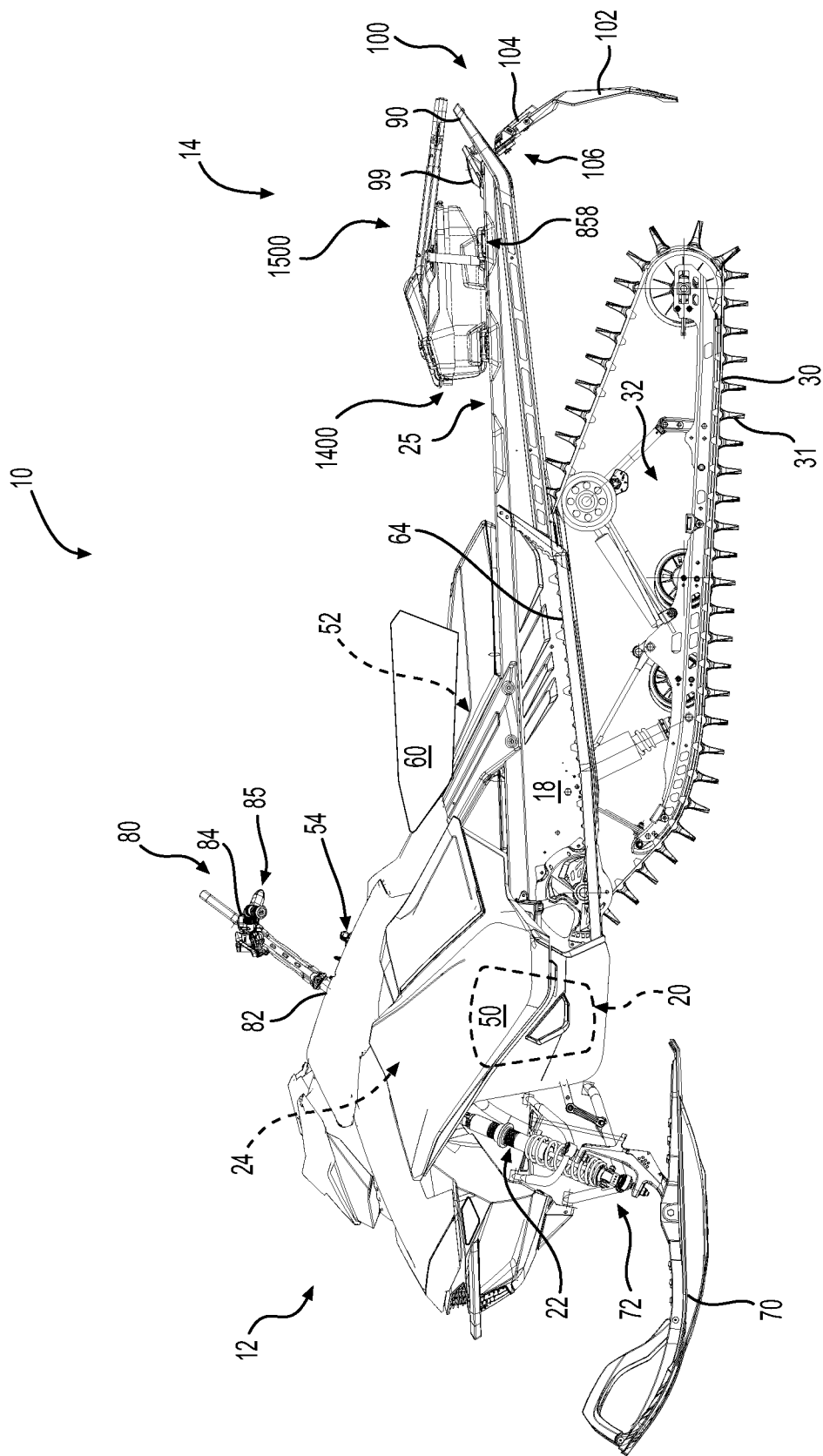
FIG. 1 is a left side elevation view of a snowmobile with a flap assembly, a bag and a shovel.

Referring to FIG. 1, a snowmobile 10 includes a forward end 12 and a rearward end 14 which are defined consistently with a travel direction of the snowmobile 10. The snowmobile 10 includes a vehicle body in the form of a chassis or a frame 16 which includes a tunnel 18, an engine cradle 20, a front suspension module 22 and an upper support structure 24.

A motor 50 (schematically illustrated in FIG. 1), which in the illustrated implementation is an internal combustion engine, is carried in an engine compartment defined by the engine cradle 20. A fuel tank 52, supported above the tunnel 18, supplies fuel to the engine 50 for its operation. Coolant used to cool the engine 50 is circulated through heat exchanger 25 mounted to the tunnel 18.

An endless drive track 30 is positioned at the rearward end 14 of the snowmobile 10. The drive track 30 is disposed generally under the tunnel 18, and operatively connected to the motor 50 through a belt transmission system (not shown) and a reduction drive (not shown). The endless drive track 30 is driven to run about a rear suspension assembly 32 connected to the tunnel 18 for propulsion of the snowmobile 10. The endless drive track 30 has a plurality of lugs 31 extending from an outer surface thereof to provide traction to the endless drive track 30. It is contemplated that the snowmobile 10 could be provided with a different implementation of a rear suspension assembly 32 than the one shown in FIG. 1.

A straddle-type seat 60 is disposed above the fuel tank 52. It is contemplated that the straddle-type seat 60 could be positioned on the tunnel 18. A fuel tank filler opening covered by a cap 54 is disposed on the upper surface of the fuel tank 52 in front of the straddle-type seat 60. It is contemplated that the fuel tank filler opening could be disposed elsewhere on the fuel tank 52. The straddle-type seat 60 is adapted to accommodate a driver of the snowmobile 10. Optionally, the straddle-type seat 60 may also be configured to accommodate a passenger. A footrest 64, in the form of a footboard, is positioned on each side of the snowmobile 10 below the straddle-type seat 60 to accommodate a driver's feet.

Two skis 70 (only a left one of which is shown in FIG. 1) positioned at the forward end 12 of the snowmobile 10 are attached to the front suspension module 22 of the frame 16 through front suspension assemblies 72. The front suspension module 22 is connected to the front end of the engine cradle 20.

A steering assembly 80, including a steering column 82 and a handlebar 84, is provided generally forward of the straddle-type seat 60. The steering column 82 is rotatably connected to the frame 16. The lower end of the steering column 82 is connected to the skis 70. The handlebar 84 is attached to the upper end of the steering column 82. The handlebar 84 is positioned in front of the straddle-type seat 60. The handlebar 84 is used to rotate the steering column 82, and thereby the skis 70, in order to steer the snowmobile 10. A throttle operator in the form of a thumb-actuated throttle lever 85 is mounted to the right side of the handlebar 84. Other types of throttle operators, such as a finger-actuated throttle lever and a twist grip, are also contemplated. A brake actuator (not indicated), in the form of a hand-brake lever, is provided on the left side of the handlebar 84 for braking the snowmobile 10 in a known manner.

At the rearward end 14 of the snowmobile 10, there is a rear bumper 90 and a brake light assembly 99, which are connected to a rear portion of the tunnel 18. The rear bumper 90, in the form of an inverted U-shaped tubular structure, extends above the rear portion of the tunnel 18 and extends above the brake light assembly 99.

At the rearward end 14 of the snowmobile 10, there is also a flap assembly 100 connected to the rear portion of the tunnel 18. The flap assembly 100 allows a selective connection of a flap 102 to the rear portion of the tunnel 18. The flap assembly 100 also allows the selective and removable connection of the flap 102 in several distinct positions to the snowmobile 10.

Figure 2:
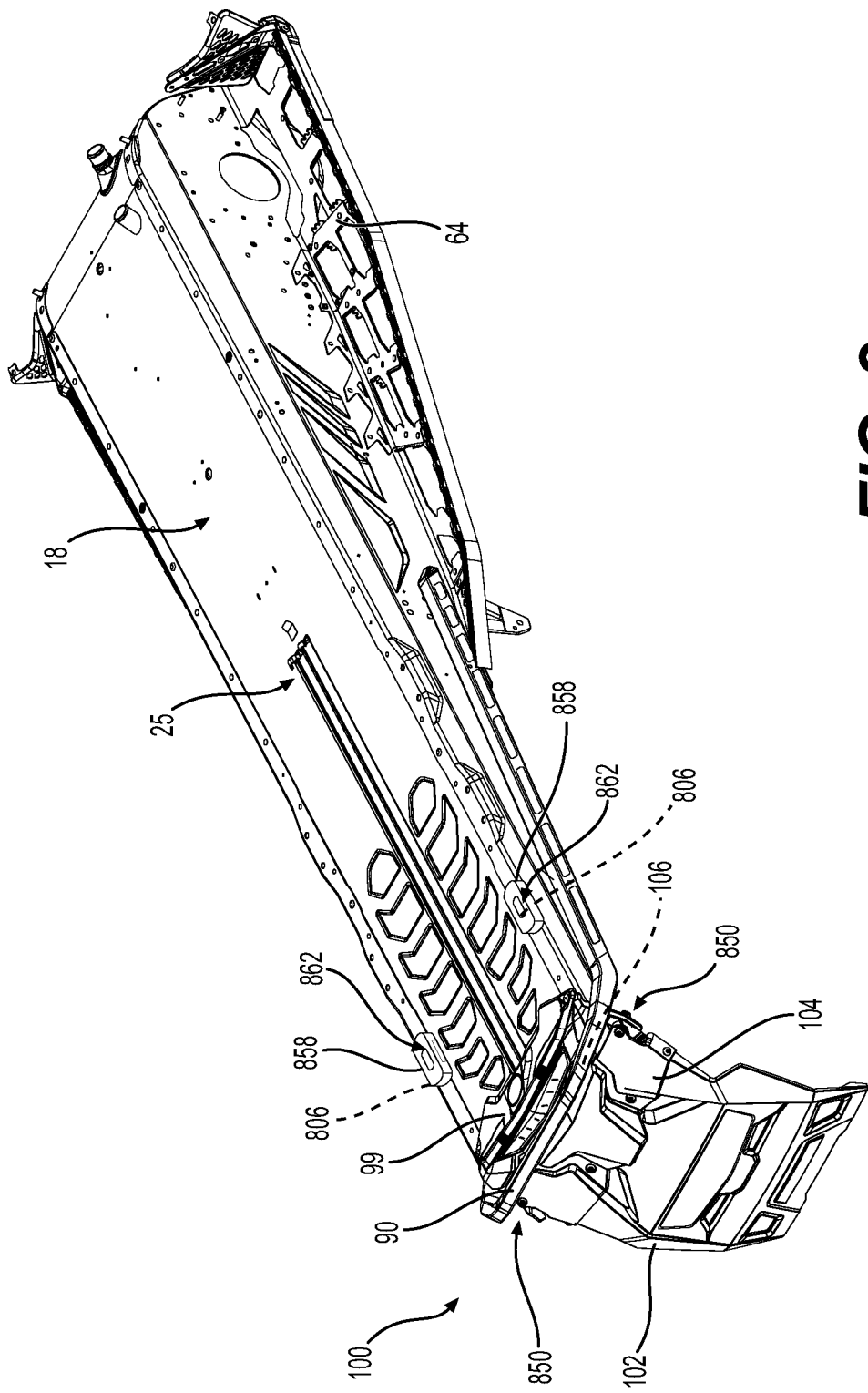
FIG. 2 is a perspective view, taken from a rear, right side, of a tunnel of the snowmobile of FIG. 1 with a flap of the flap assembly connected to a rear portion of the tunnel, without the bag and without the shovel.
Figure 3:
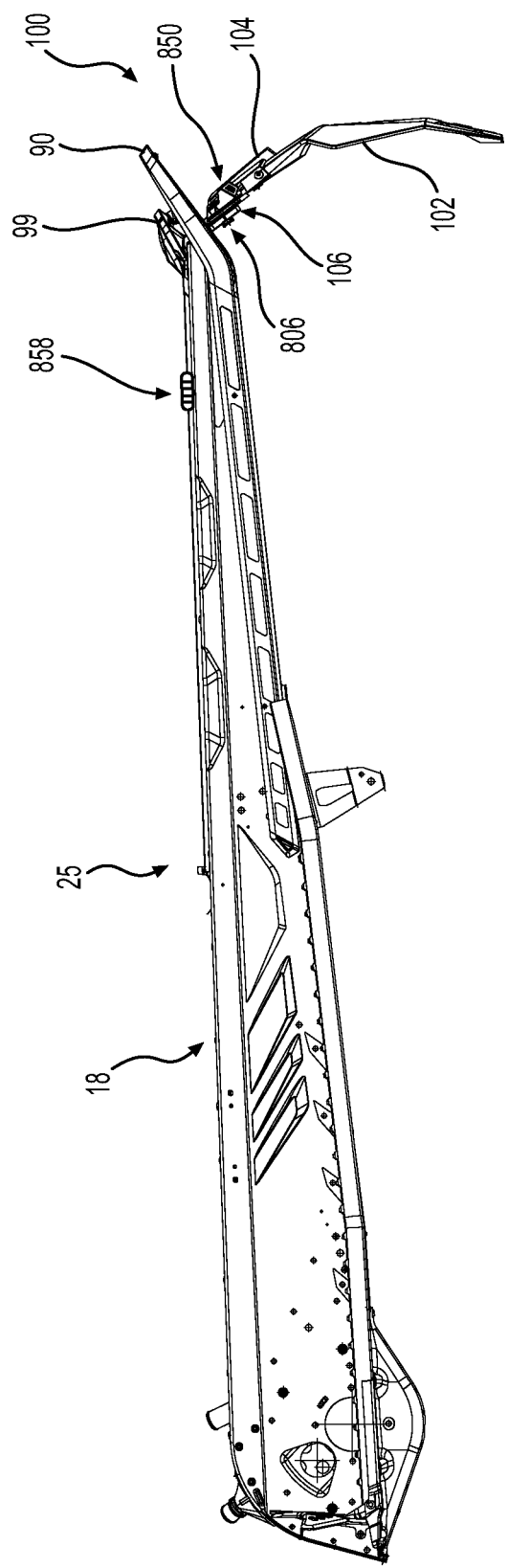
FIG. 3 is a left side elevation view of the tunnel and of the flap assembly of FIG. 2.
Figure 4:
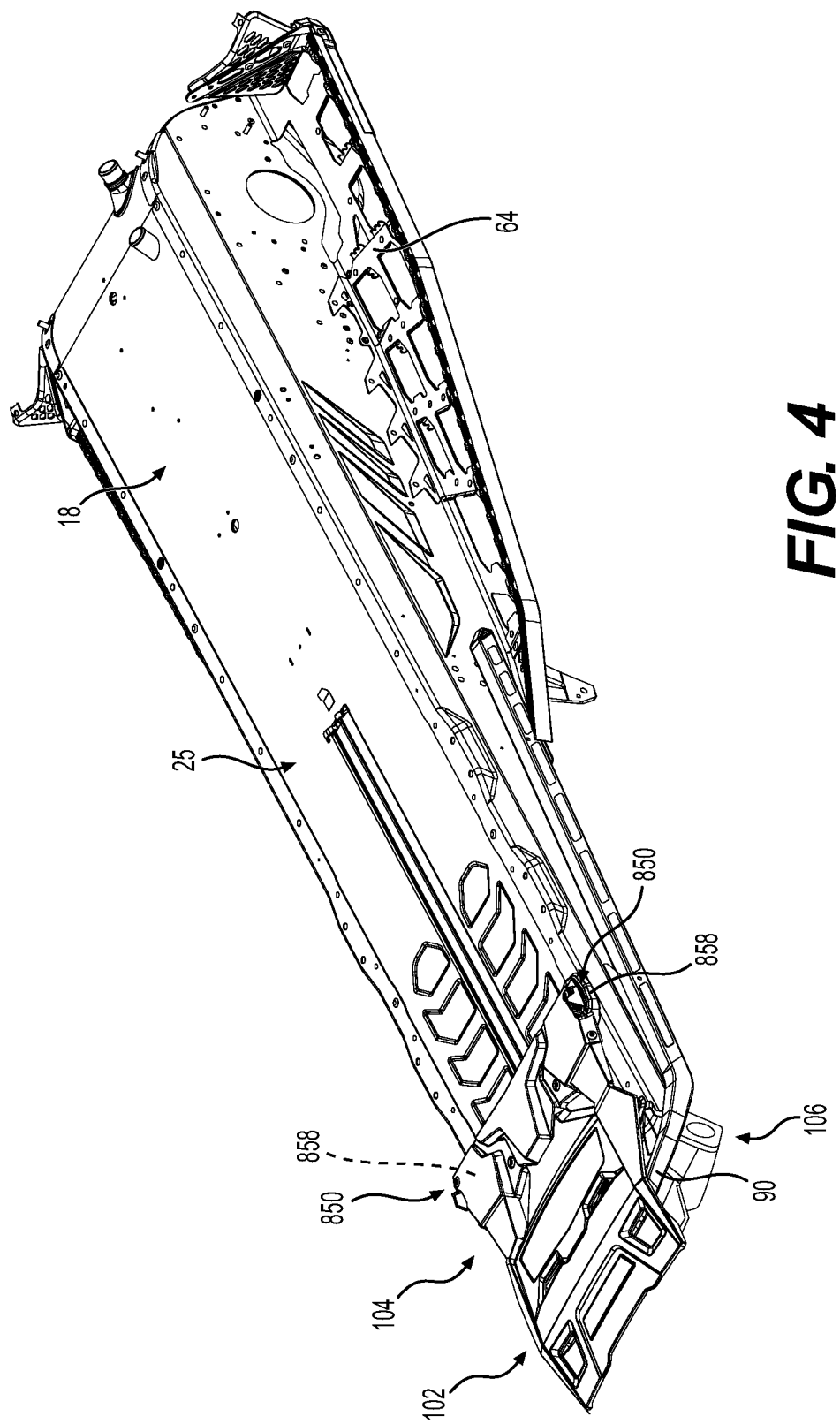
FIG. 4 is a perspective view, taken from a rear, right side, of the tunnel with the flap connected in a stored position.
Figure 5:
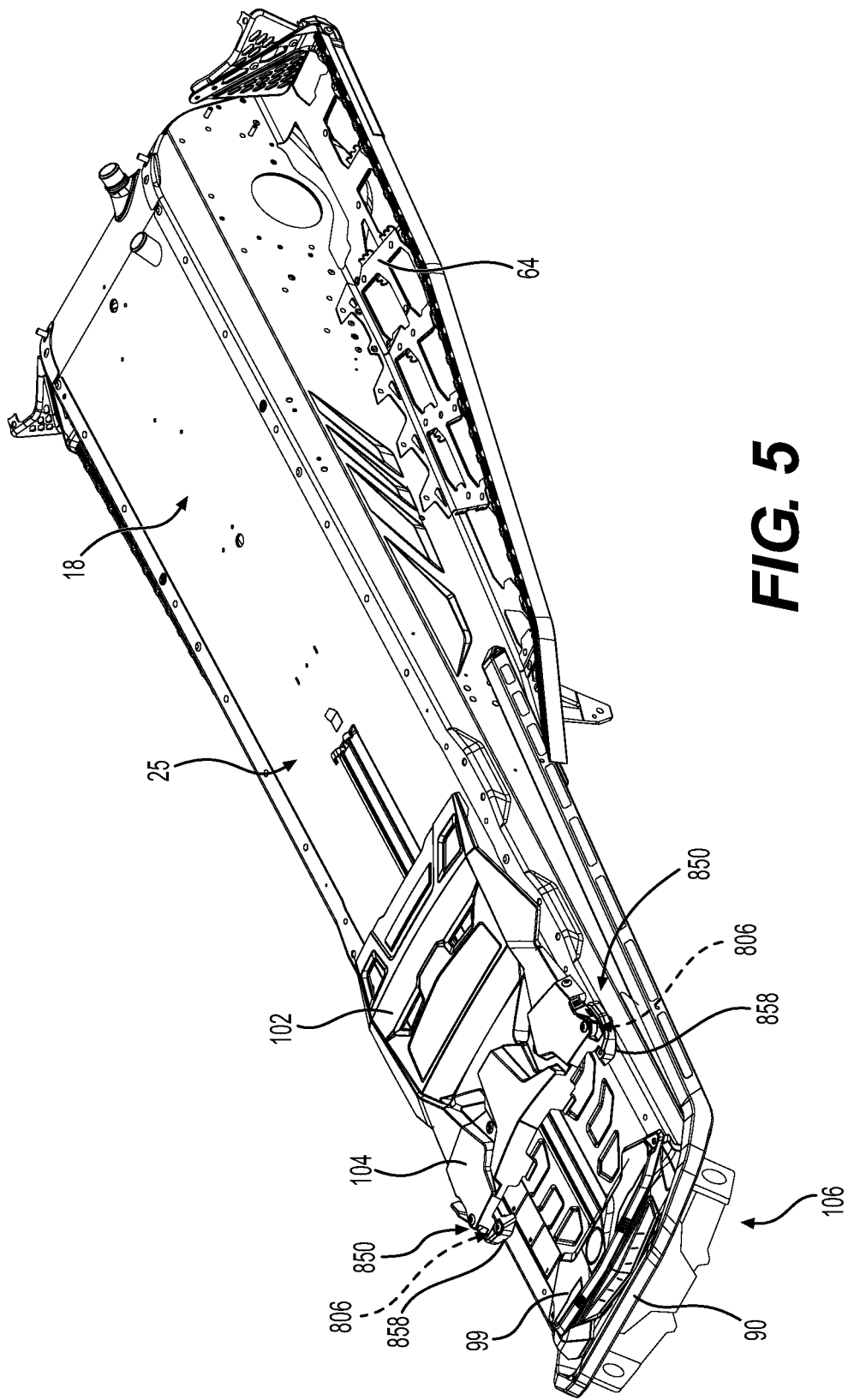
FIG. 5 is a perspective view, taken from a rear, right side, of the tunnel with the flap connected in an alternative stored position.
Figure 6:
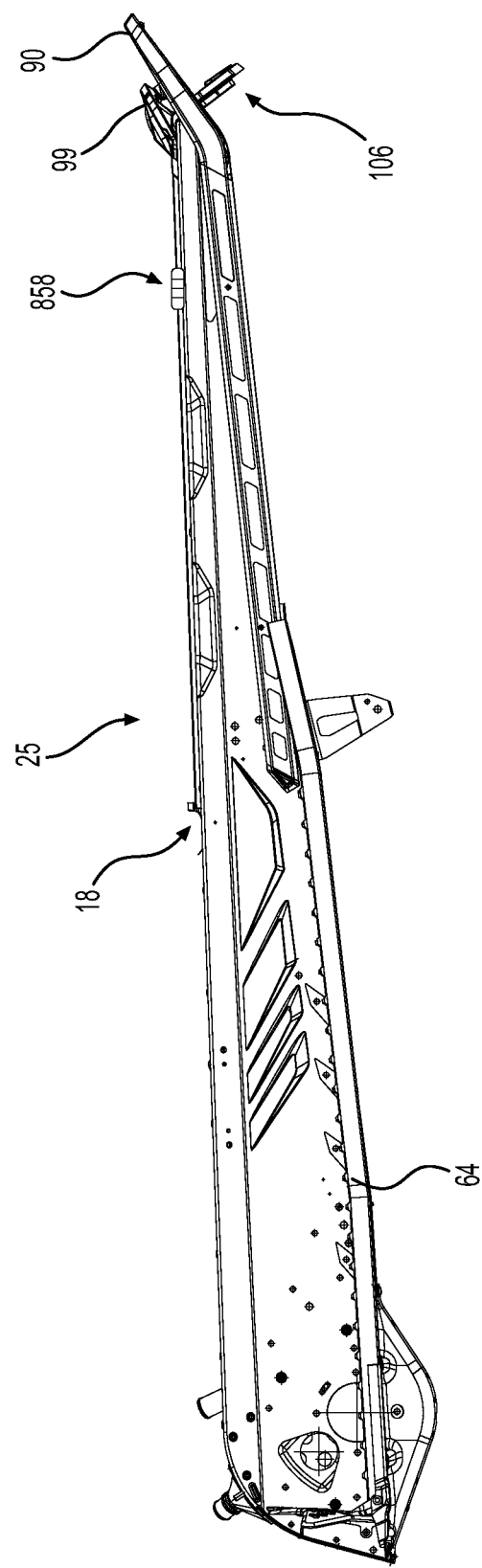
FIG. 6 is a left side elevation view of the tunnel and a mounting body of the flap assembly.
Figure 7:
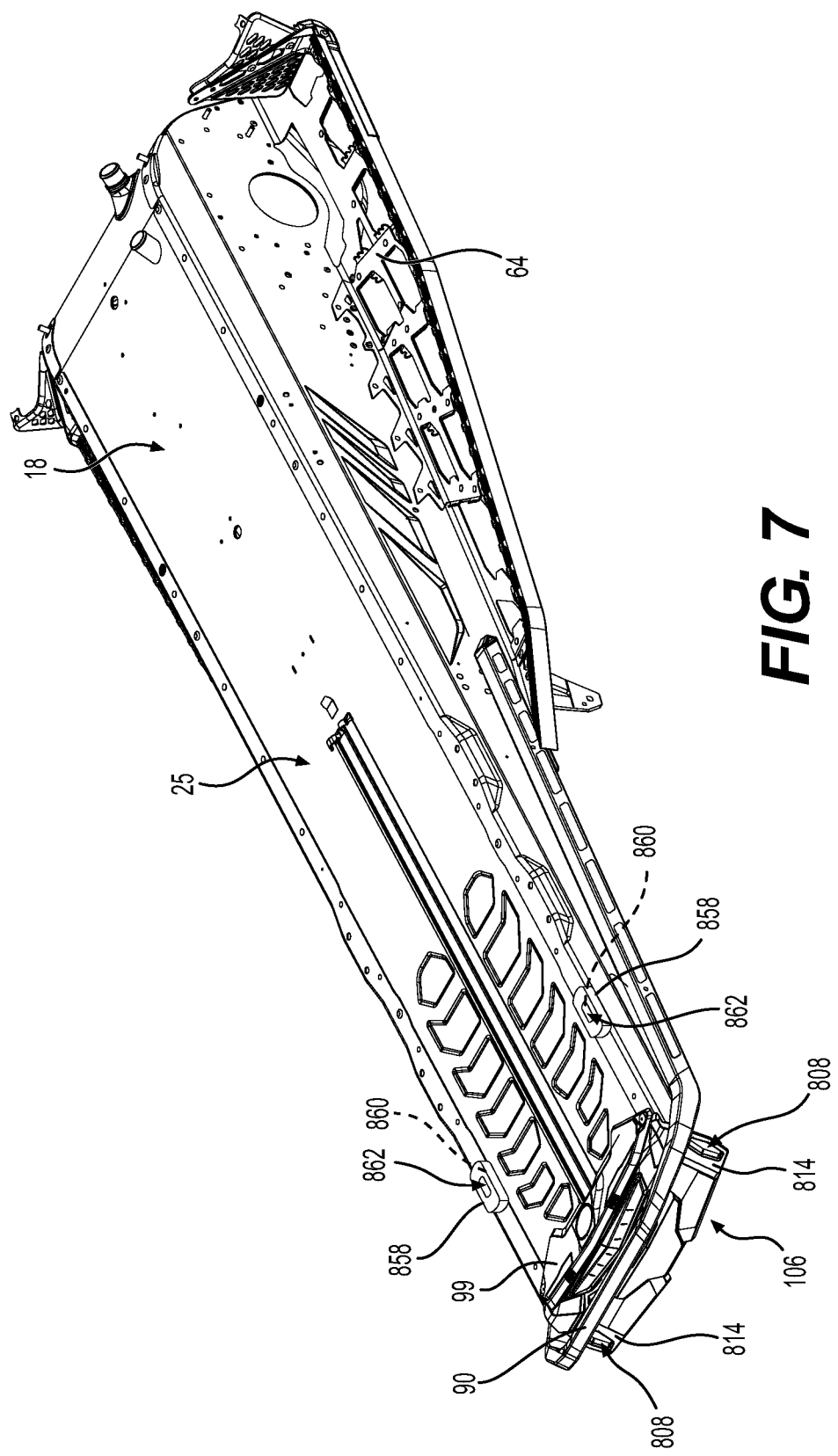
FIG. 7 is a perspective view, taken from a rear, right side, of the tunnel and the mounting body of FIG. 6.

As best depicted in FIGS. 2 and 3, the flap 102 is connected in a guard position to the rear portion of the tunnel 18. In FIG. 4, the flap 102 is connected in a stored position to a top side of the tunnel 18. In FIG. 5, the flap 102 is connected in an alternative stored position to the top side of the tunnel 18. In FIGS. 6 and 7, the flap 102 is disconnected from the snowmobile 10 and is removed.

In the guard position, the flap 102 helps protect against snow and ice that can be projected rearward and upward by the endless drive track 30 (see FIG. 1) when the snowmobile 10 is being driven. A downwardly extending portion of the flap 102 defines a surface facing the endless drive track 30 that is arcuate. In the guard position, a lower end of the flap 102 is disposed rearward of the rearmost point of the endless drive track 30. It is contemplated that in the guard position, the flap 102 may extend partially rearward of the endless drive track 30. As such, during operation of the snowmobile 10, some of the snow projected rearward and upward by the endless drive track 30 is redirected upwardly and forwardly so as to be projected onto the heat exchanger 25 connected to the tunnel 18 to improve cooling of the engine 50. The flap 102 is made of a flexible material such as a thermoplastic or a plastic elastomere synprene which can bend relative to the tunnel 18.

Figure 8:
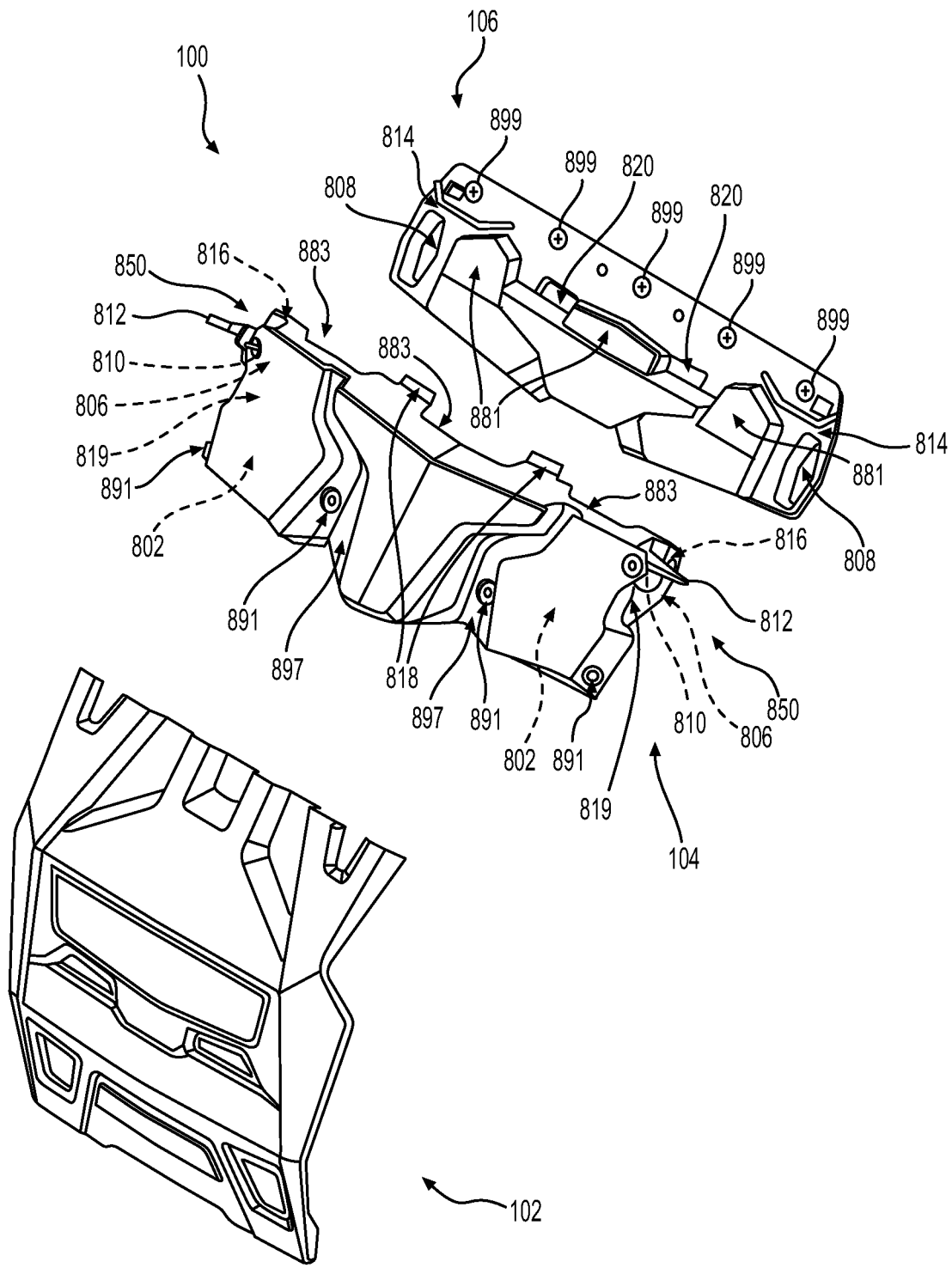
FIG. 8 is a partially exploded perspective view, taken from a rear, right side, of the flap assembly of FIG. 1 with toolless fasteners in unlocked positions.
Figure 9:
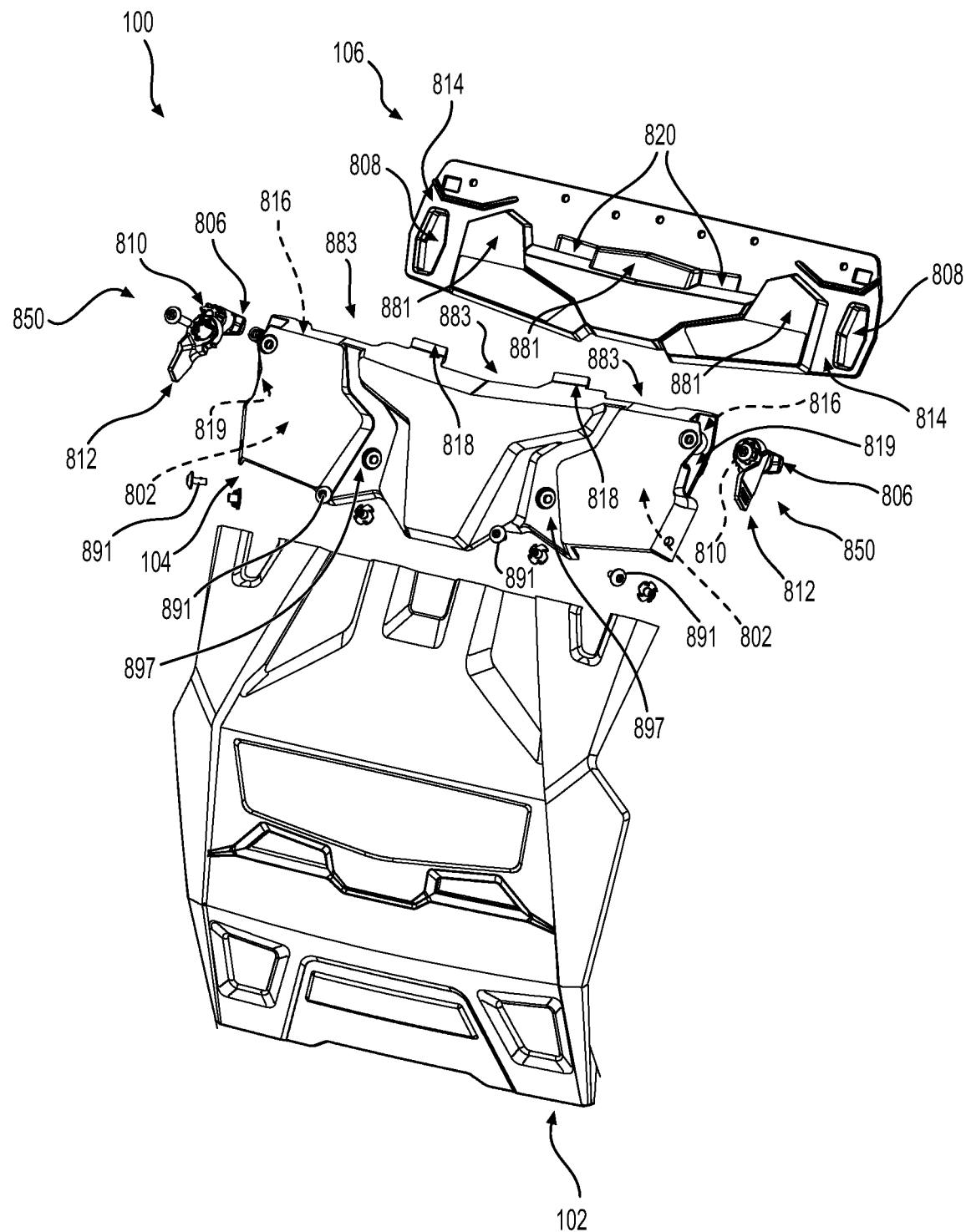
FIG. 9 is an exploded perspective view, taken from a rear, right side, of the flap assembly of FIG. 8 with the toolless fasteners in locked positions.

The flap assembly 100 will now be described in more detail. As best seen in FIGS. 8 and 9, the flap assembly 100 has the flap 102, a linking body 104 and a mounting body 106. It is contemplated that in some implementations, the linking body 104 may be omitted, as it will be described below and without departing from the scope of the present technology.

As best seen in FIGS. 3 and 6, the mounting body 106 is mounted to the rear portion of the tunnel 18 such that it extends from under the brake light assembly 99, through an opening formed by the rear portion of the tunnel 18 and the rear bumper 90. The mounting body 106 also extends partially rearward from the tunnel 18 and generally downward of the rear bumper 90 and the brake light assembly 99. The mounting body 106 is fastened to the rear portion of the tunnel 18 by five rivets 899 (see FIG. 8). In order to fasten the mounting body 106 to the rear portion of the tunnel 18 by the five rivets 899, the person installing the mounting body 106 requires a tool. It is contemplated, that the mounting body 106 could be fastened by more or less than the five rivets 899. It is also contemplated that other types of fasteners may be used for fastening the mounting body 106 to the rear portion of the tunnel 18. The mounting body 106 is mounted to the rear portion of the tunnel 18 such that the brake light assembly 99 is not obscured by the mounting body 106.

The linking body 104 will now be described with reference to FIGS. 3, 8 and 9. The linking body 104 has inner recesses 802. The flap 102 is partially inserted in the inner recesses 802. The flap 102 is fastened to the linking body 104 by four screws 891. It is contemplated that the flap 102 could be fastened by more or less than the four screws 891. It is also contemplated that other types of fasteners may be used for fastening the flap 102.

Figure 12:
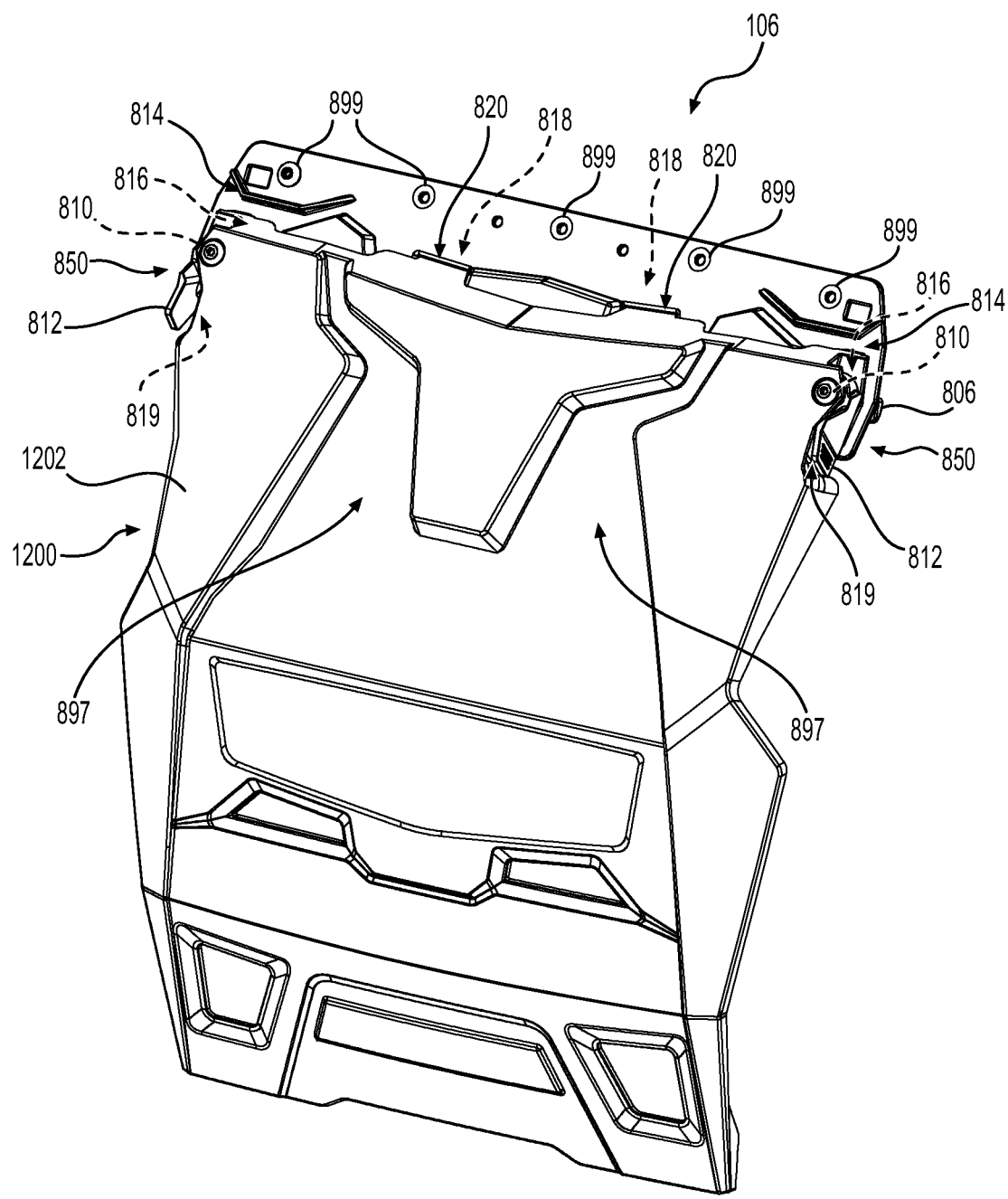
FIG. 12 is a perspective view, taken from a rear, right side, of an assembled alternative flap assembly.

In an alternative implementation of the present technology and with reference to FIG. 12, there is provided an alternative flap assembly 1200. Similarly to the flap assembly 100, the flap assembly 1200 has the mounting body 106 for connection to the rear portion of the tunnel 18. However, unlike the flap assembly 100 which has the linking body 104 and the flap 102, the flap assembly 1200 has a flap 1202. The flap 1202 integrates the physical features and functions of the linking body 104 and the flap 102 described herein in a single integrally formed part. For simplicity, parts of the alternative flap assembly 1200 that correspond to parts of the flap assembly 100 described herein have been labeled with the same reference numerals and will not be described again herein in detail.

Returning to FIGS. 3, 8 and 9, the linking body 104 is selectively and removably connected to the mounting body 106. To that end, the linking body 104 is provided with two toolless fasteners 850. The toolless fasteners 850 (i.e. fasteners designed to be fastened and unfastened without requiring the use of a tool) are partially inserted through respective apertures 808. The toolless fasteners 850 extend generally longitudinally when they are inserted through the respective apertures 808. The toolless fasteners 850 have a structure and operate similarly to anchors described in PCT patent application publication no. WO2012/002959 published on Jan. 5, 2012, the entirety of which is incorporated herein by reference. It is contemplated that other types of toolless fasteners could be used, such as, for example, quarter turn screws, butterfly screws, quick release pins or latches.

Figure 10:
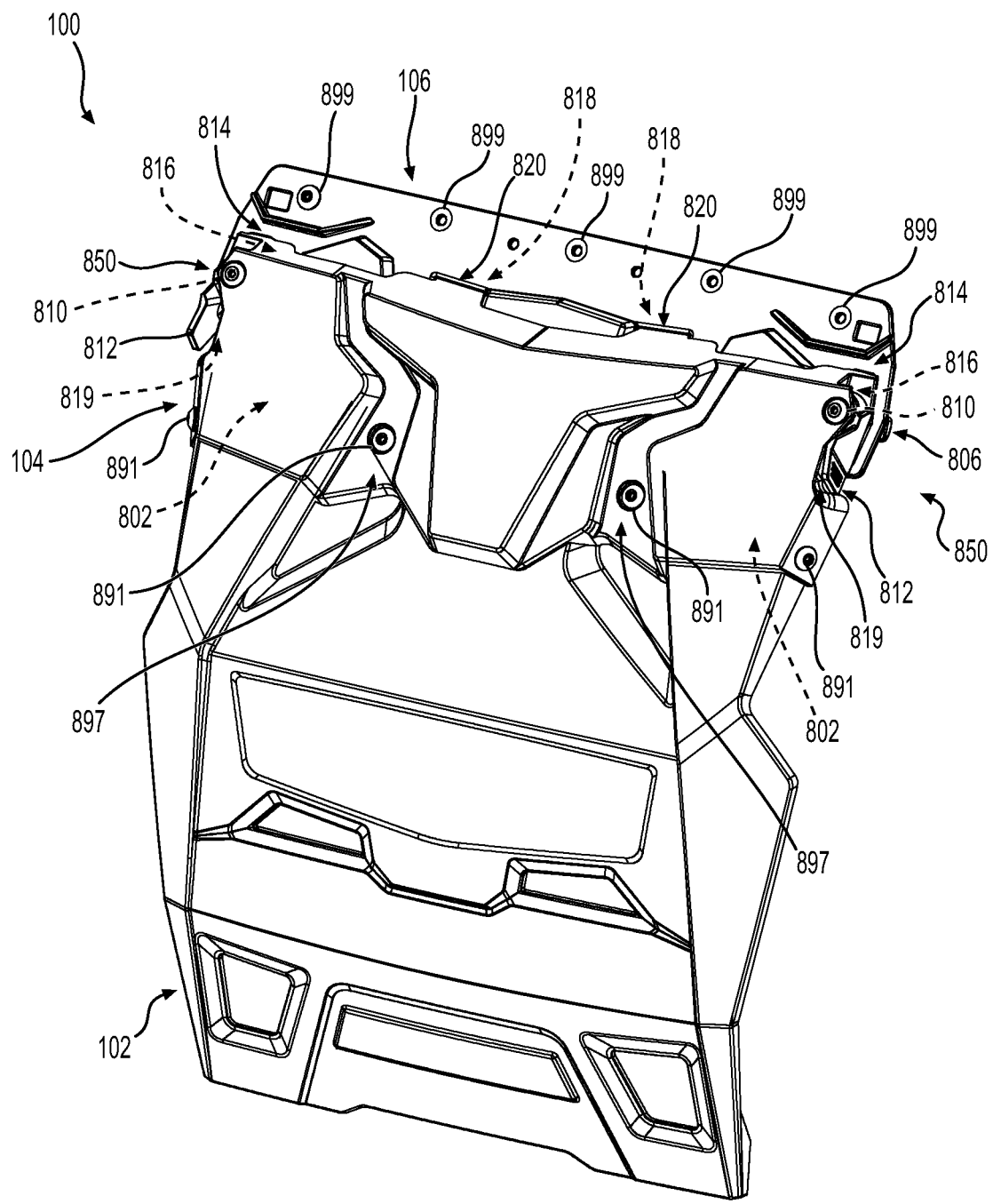
FIG. 10 is a perspective view, taken from a rear, right side, of the assembled flap assembly of FIG. 9 with the linking body connected to the mounting body.

The toolless fasteners 850 cooperate with respective apertures 808 defined in the mounting body 106 as best seen in FIGS. 8 and 9. The toolless fasteners 850 include respective anchors 806. The anchors 806 are pivotally connected to the linking body 104 by respective anchor axles 810 of the toolless fasteners 850. The toolless fasteners 850 also include respective axle levers 812 for allowing the rider to selectively pivot the respective anchor axles 810, which in turn pivot the respective anchors 806. In FIG. 8, the axle levers 812 and the anchors 806 are shown in unlocked positions. In FIGS. 9 and 10, the axle levers 812 and the anchors 806 are shown in locked positions. In the present implementation, the axle levers 812 allow a quarter-rotation of the respective anchor axles 810 and the anchors 806. It is contemplated that the axle levers 812 may allow alternative pivotal ranges which will depend on the shapes of the anchors 806 and of the apertures 808.

The anchors 806 are spaced away from the linking body 104 such that, when contacting surfaces 814 and 816 (see FIGS. 8 and 9) meet each other, the anchors 806 entirely pass through the respective apertures 808. The anchors 806 are inserted generally longitudinally through the respective apertures 808. When the anchors 806 are entirely inserted through the respective apertures 808, the anchor axles 810 of the toolless fasteners 850 extend generally longitudinally so as to allow the rider to selectively pivot the axle levers 812, the anchor axles 810 and the anchors 806 about a generally longitudinal axis. The anchors 806 selectively cooperate with the respective apertures 808 in order to selectively connect the linking body 104 to the mounting body 106. The anchors 806 and the apertures 808 have similar shapes and the apertures 808 define respective areas slightly larger than areas occupied by the anchors 806 such that the anchors 806 can be snugly inserted in the apertures 808. The areas defined by the apertures 808 are normal to the anchor axles 810 when the anchors 806 are entirely inserted through the respective apertures 808. The anchors 806 and the apertures 808 are hexagonally shaped. It is contemplated that the anchors 806 and the apertures 808 may have other shapes, such as rectangular shapes for example, and without departing from the scope of the present technology.

As seen in FIGS. 8 and 9, the mounting body 106 defines the apertures 808 and the linking body 104 is provided with the toolless fasteners 850. It is contemplated that the mounting body 106 may be provided with the toolless fasteners 850 and the linking body 104 may define the apertures 808 without departing from the scope of the present technology. It is also contemplated that the flap 102 may be provided with the toolless fasteners 850 without the need for the linking body 104 in order to selectively connect the flap 102 to the mounting body 106. It is also contemplated that the mounting body 106 may be provided with the toolless fasteners 850 and the flap 102 may define the apertures 808 without the need for the linking body 104 in order to selectively connect the flap 102 to the mounting body 106.

The linking body 104 has two supporting protrusions in the form of tongues 818. The mounting body 106 has two supporting apertures in the form of grooves 820. When the linking body 104 is connected to the mounting body 106, the tongues 818 are received by the respective grooves 820. The tongues 818 and the grooves 820 provide additional support and aid in aligning the linking body 104 with the mounting body 106 for selectively connecting the flap 102 to the snowmobile 10 in the guard position thereof. Also, when the tongues 818 are received by the respective grooves 820, the tongues 818 and the grooves 820 cooperate in order to prevent the linking body 104 from flexing away from the mounting body 106. The contacting surface 814 has abutting protrusions 881 disposed in a pattern and the contacting surface 816 has abutting recesses 883 disposed in a pattern that matches the pattern of the abutting protrusions 881 of the contacting surface 814. These matching patterns aid in aligning and securing the linking body 104 to the mounting body 106.

It is possible that the snowmobile 10 may experience the aforementioned jacking effect when the flap 102 is in the guard position. In such a case, the flap 102 contacts the deep soft snow and is bent relative to the tunnel 18 toward the rear bumper 90. The linking body 104 defines exterior surface recesses 897 in order to allow passage of the user's hands between the linking body 104 and the rear bumper 90. Therefore, when the snowmobile 10 is jacked via the flap 102 that is in the guard position, a passage that is partially defined by the exterior surface recesses 897 and the rear bumper 90 may allow the user to grip the rear bumper 90 and lift the rearward end 14 for removing the snowmobile 10 from the trench it dug in the deep soft snow.

It is contemplated that the linking body 104 may have one or more than two tongues 818 and the mounting body 106 may have a corresponding number of grooves 820 in order to receive the one or more than two tongues 818 when the linking body 104 is connected to the mounting body 106. It is also contemplated that the linking body 104 may be provided with the grooves 820 and the mounting body 106 may be provided with the tongues 818. It is also contemplated that the flap 102 may have flap tongues that are similar to the tongues 818 in order to be received by the grooves 820 when the flap 102 is connected to the mounting body 106 without the need for the linking body 104. It is also contemplated that the mounting body 106 may have tongues similar to the tongues 818 and the flap 102 may have flap grooves similar to the grooves 820 in order to receive the tongues 818 of the mounting body 106 when the flap 102 is connected to the mounting body 106 without the need for the linking body 104. It is also contemplated that the mounting body 106 may have a single large groove for receiving the two tongues 818.

As depicted in FIGS. 3 and 10, when the linking body 104 is connected to the mounting body 106, the linking body 104 partially overlaps, and abuts against, the mounting body 106. As previously mentioned, when the flap 102 is connected to the mounting body 106, the flap 102 is in the guard position (as in FIGS. 3 and 10). In the guard position, the flap 102 extends partially downward of the tunnel 18. In the guard position, the flap 102 extends generally downward from the mounting body 106. In the guard position, the flap 102 extends rearward of the tunnel 18. It is contemplated that in the guard position, the flap 102 may extend entirely downward of the tunnel 18 and/or partially rearward of the tunnel 18.

In order to selectively and removably connect the flap 102 to the snowmobile 10, the rider needs to abut the linking body 104 against the mounting body 106. The linking body 104 is connected to the flap 102 such that the flap 102 extends from the linking body 104 while the mounting body 106 is mounted to the rear portion of the tunnel 18. In order to abut the linking body 104 against the mounting body 106, the rider can insert tongues 818 into grooves 820. In order to insert the tongues 818 into the grooves 820, the linking body 104 which receives the flap 102, has to be positioned such that the contacting surfaces 814 and 816 are at an angle (not shown). When the tongues 818 are inserted into the grooves 820, the rider pivots the linking body 104 towards the mounting body 106 so that the contacting surfaces 814 and 816 can meet.

The rider can then proceed to fastening the linking body 104 to the mounting body 106 using the toolless fasteners 850. This step allows the flap 102 to be retained and secured to the rear portion of the tunnel 18.

The anchors 806 of the toolless fasteners 850 are inserted into the apertures 808 defined in the mounting body 106 by pivoting the linking body 104 toward the mounting body 106. When the anchors 806 are inserted into the apertures 808, the contacting surfaces 814 and 816 meet each other. When the tongues 818 are received in the respective grooves 820 and the anchors 806 are inserted in the respective apertures 808, the linking body 104 and the flap 102 are retained by the mounting body 106.

The anchors 806 of the toolless fasteners 850 are turned once the anchors 806 are inserted in the apertures 808. The anchors 806 are turned in response to the axle levers 812 being pivoted. When the axle levers 812 are pivoted towards the linking body 104, from their unlocked positions to their locked positions, the axle levers 812 are received in respective recesses 819 of the linking body 104. When the axle levers 812 are in their locked positions, the anchors 806 retain and secure the linking body 104 to the mounting body 106 (see FIG. 10). The anchors 806 cooperate with the apertures 808 for connecting the flap 102 to the snowmobile 10. As depicted in FIG. 8, when the axle levers 812 are in their unlocked positions, the axle levers 812 extend outwardly of the flap assembly 100 and provide the rider with visual feedback that the toolless fasteners 850 are unlocked. As depicted in FIG. 10, when the axle levers 812 are in their locked positions, the axle levers 812 extend along the flap assembly 100 and provide the rider with visual feedback that the toolless fasteners 850 are locked. This visual feedback helps preventing the toolless fasteners 850 from remaining inadvertently unlocked.

As depicted in FIGS. 3 and 10, the anchors 806 are inserted in the respective apertures 808. The toolless fasteners 850 selectively connect the flap 102 to opposite sides of a lateral center (not numbered) of the mounting body 106.

When the rider plans on operating the snowmobile 10 over deep soft snow, in order to reduce the aforementioned jacking effect, the rider can easily disconnect the flap 102 and the linking body 104 from the mounting body 106 and connect the flap 102 to the top side of the tunnel 18 in a stored position such as depicted in FIG. 4.

In order to disconnect the flap 102 and the linking body 104 from the mounting body 106, the rider unlocks the toolless fasteners 850 such that the anchors 806 release the linking body 104 from the mounting body 106. When the axle levers 812 are pivoted away from the linking body 104, from their locked positions to their unlocked positions, the anchors 806 stop cooperating with the apertures 808. The rider then removes the anchors 806 from the apertures 808 by pivoting the flap 102 and the linking body 104 away from the mounting body 106 such that the contacting surfaces 814 and 816 are at the angle. Then, the tongues 818 are removed from the grooves 820.

In FIG. 4, the linking body 104 and the flap 102 are connected to the top side of the tunnel 18 by the toolless fasteners 850 while the mounting body 106 remains connected to the rear portion of the tunnel 18. The toolless fasteners 850 cooperate with respective connection bodies 858 in order to connect the flap 102 to the top side of the tunnel 18. The connection bodies 858 are fastened to the top side of the tunnel 18. Each connection body 858 has a cavity 860 and an aperture 862 providing passage to the respective cavity 860 (see FIG. 7). The apertures 862 define areas identical to areas defined by the apertures 808 and have a shape identical to the shape of the apertures 808. When the anchors 806 pass through the respective apertures 862 and are inserted in the respective cavities 860, the axle levers 812 are moved from their unlocked positions to their locked positions. As a result, the flap 102 and the linking body 104 are retained and secured to the top side of the tunnel 18. Each cavity 860 defines a sufficient volume for allowing the respective anchor 806 to pivot therein when the respective axle lever 812 is moved from the unlocked position to the locked position. When the flap 102 is in the stored position depicted in FIG. 4, the flap 102 extends above the rear bumper 90 and partially rearward of the tunnel 18. As such, in the stored position, the jacking effect caused by the flap 102 is reduced, with comparison with the flap 102 being in the guard position, while still being able to provide some snow deflection. Optionally, the connection bodies 858 may be fastened to the top side of the tunnel 18 more forwardly to what is depicted in FIG. 4, such that when the flap 102 is in the stored position, the flap 102 may extend entirely over the tunnel 18. As a result, the jacking effect caused by the flap 102 in the stored position may be completely eliminated.

Optionally, in order to further reduce the jacking effect, the rider can disconnect the flap 102 from the mounting body 106 and connect the flap 102 to the top side of the tunnel 18 in an alternative stored position such as depicted in FIG. 5. The flap 102 is connected to the top side of the tunnel 18 in the alternative stored position by the toolless fasteners 850, similarly to how the flap 102 can be connected to the top side of the tunnel 18 in the stored position. In the alternative stored position, the flap 102 and the linking body 104 are rotated by 180 degrees from the stored position shown in FIG. 4. As such, in the alternative stored position, the flap 102 is connected to the top side of the tunnel 18 such that it extends forwardly from the connection bodies 858 in order to completely eliminate the jacking effect caused by the flap 102.

Optionally, the rider can decide to remove the flap 102 from the snowmobile 10 completely. The rider may proceed with placing the flap 102 and the linking body 104 into a storage container, for example.

Figure 13:
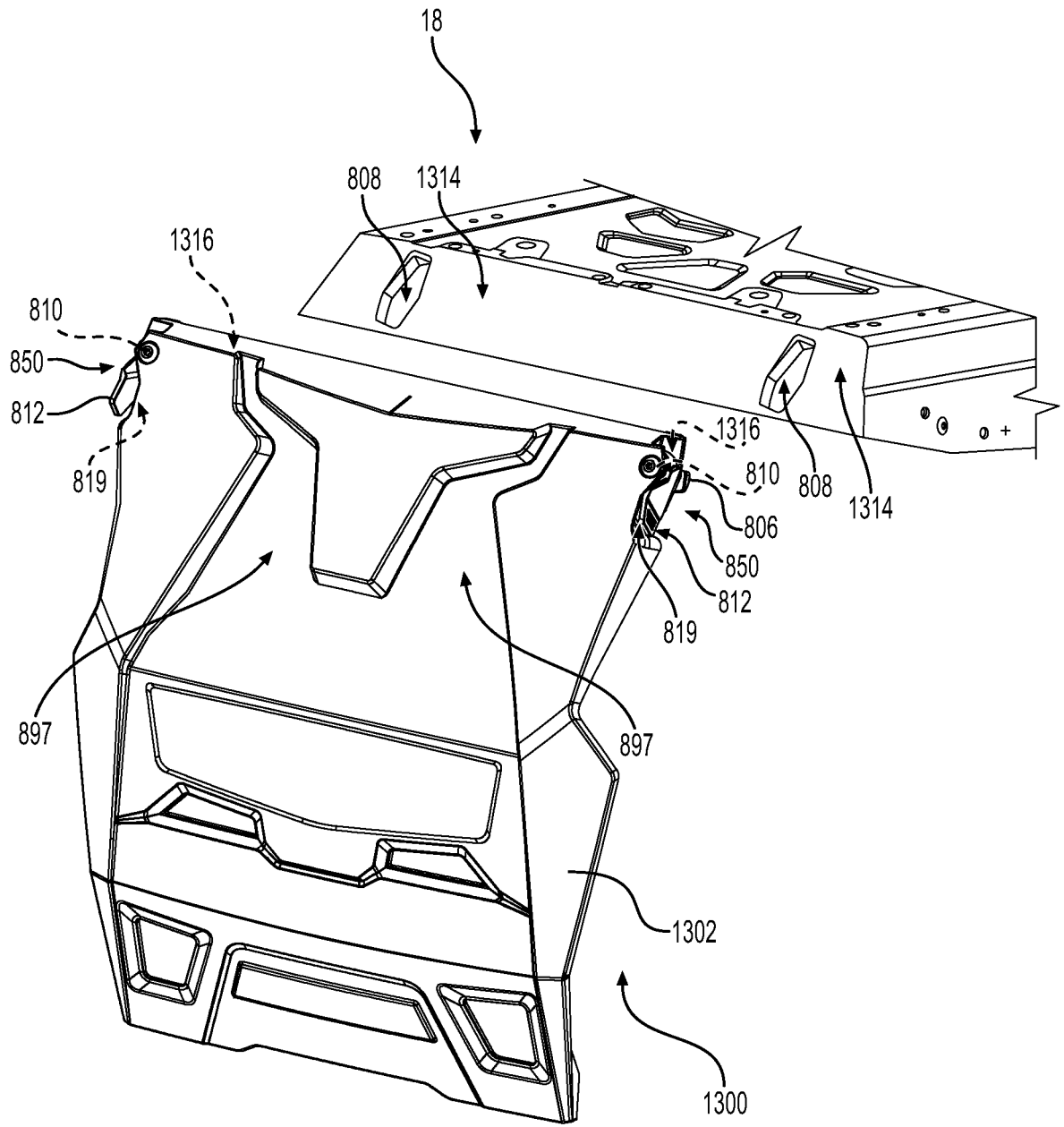
FIG. 13 is a perspective view, taken from a rear, right side, of another alternative flap assembly.

In an additional implementation of the present technology and with reference to FIG. 13, there is provided another alternative flap assembly 1300. The flap assembly 1300 has a flap 1302 that is similar to the flap 1202 of FIG. 12. However, unlike the flap 1202, the flap 1302 has a flat contacting surface 1316 instead of the contacting surface 816. For simplicity, parts of the flap 1302 that correspond to parts of the flap 1202 described herein have been labeled with the same reference numerals and will not be described again herein in detail.

In the additional implementation, the rear portion of the tunnel 18 has a flat contacting surface 1314, as depicted in FIG. 13, adapted for selectively and removably connecting the flap 1302 to the snowmobile 10 without the need for the mounting body 106. This means that the flap assembly 1300 selectively and removably connects the flap 1302 to the snowmobile 10 without the need for the mounting body 106. To that end, the rear portion of the tunnel 18 defines the apertures 808 that are normal to the flat contacting surface 1314. When the anchors 806 are inserted in the respective apertures 808 of the rear portion of the tunnel 18, the flat contacting surfaces 1314 and 1316 meet each other and are abutted against one another. When the anchors 806 are inserted in the respective apertures 808 of the rear portion of the tunnel 18 and when the axle levers 812 are pivoted from the unlocked positions to the locked positions, the flap 1302 is fastened to the rear portion of the tunnel 18 in the guard position.

Optionally, the rider can disconnect the flap 1302 from the rear portion of the tunnel 18 and remove the flap 1302 from the snowmobile 10. To that end, the rider can unlock the toolless fasteners 850 of the flap 1302 and disconnect the flap 1302 from the rear portion of the tunnel 18 such that the flat contacting surfaces 1314 and 1316 no longer meet each other.

Optionally, the rider can selectively and removably connect the flap 1302 to the snowmobile 10 in the stored position or in the alternative stored position similarly to how the flap 102 can be selectively and removably connected to the snowmobile 10 in the stored position (see FIG. 4) or the alternative stored position (see FIG. 5), respectively.

It is contemplated that in the additional implementation the flap 1302 may be identical to the flap 1202 of FIG. 12 (i.e, having the contacting surface 816 instead of the flat contacting surface 1316). In this case, instead of the flat contacting surface 1314, the rear portion of the tunnel 18 may have an alternative contacting surface similar to the contacting surface 814 of the mounting body 106 (i.e., including the grooves 820 and the abutting protrusions 881) adapted for selectively and removably connecting the flap 1302 to the rear portion of the tunnel 18 without the need for the mounting body 106.

The flap assembly 100 can be provided as a kit. In one implementation, a flap assembly kit for the snowmobile 10 includes the mounting body 106 that is adapted for connection to the rear portion of the snowmobile 10 and the linking body 104. The linking body 104 of the kit has the toolless fasteners 850 which can selectively and removably connect the linking body 104 to the mounting body 106. It is contemplated that the kit may be provided with additional components such as the connection bodies 858, the rivets 899 and screws 891. In implementations where the flap 102 is to be connected directly to the mounting body 106, the linking body 104 may be omitted from the kit and toolless fasteners 850 would be provided separately.

Figure 11:
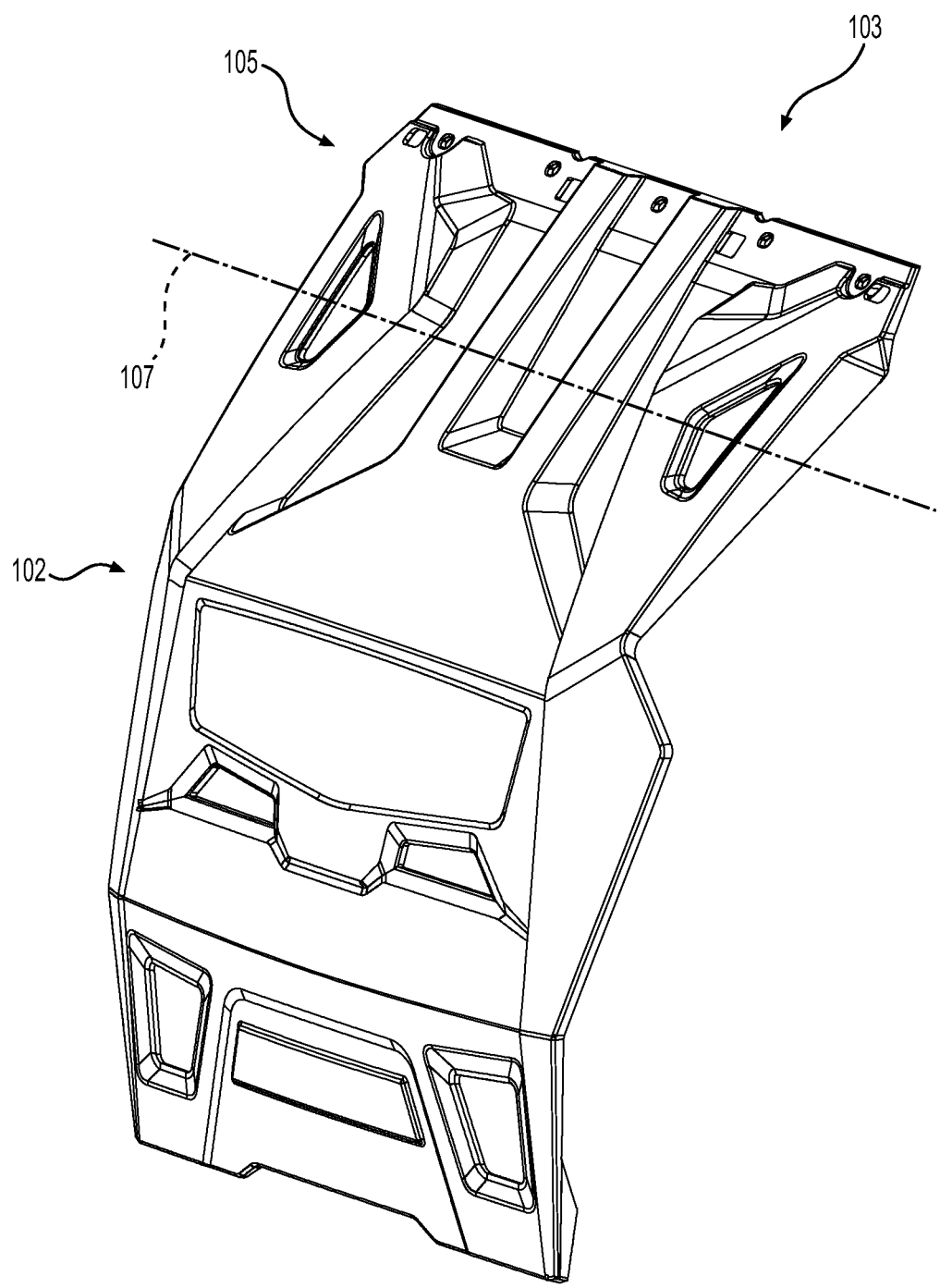
FIG. 11 is a perspective view, taken from a rear, right side, of a conventional flap.

It is contemplated that the flap assembly kit may be provided with the flap 102. However, the rider can modify a conventional flap 103 of the snowmobile 10 depicted in FIG. 11 for selectively and removably connecting it to the snowmobile 10 using the flap assembly kit described above. To that end, the rider cuts the conventional flap 103 along a line 107 such that a top portion 105 of the conventional flap 103 is cut away from a lower portion of the conventional flap 103, which then corresponds to the flap 102. The linking body 104 of the kit is then fastened to the remaining lower portion of the conventional flap 103. The mounting body 106 of the kit is fastened to the rear portion of the tunnel 18. The rider can then selectively and removably fasten the linking body 104 to the mounting body 106 as described above.

Figure 14:
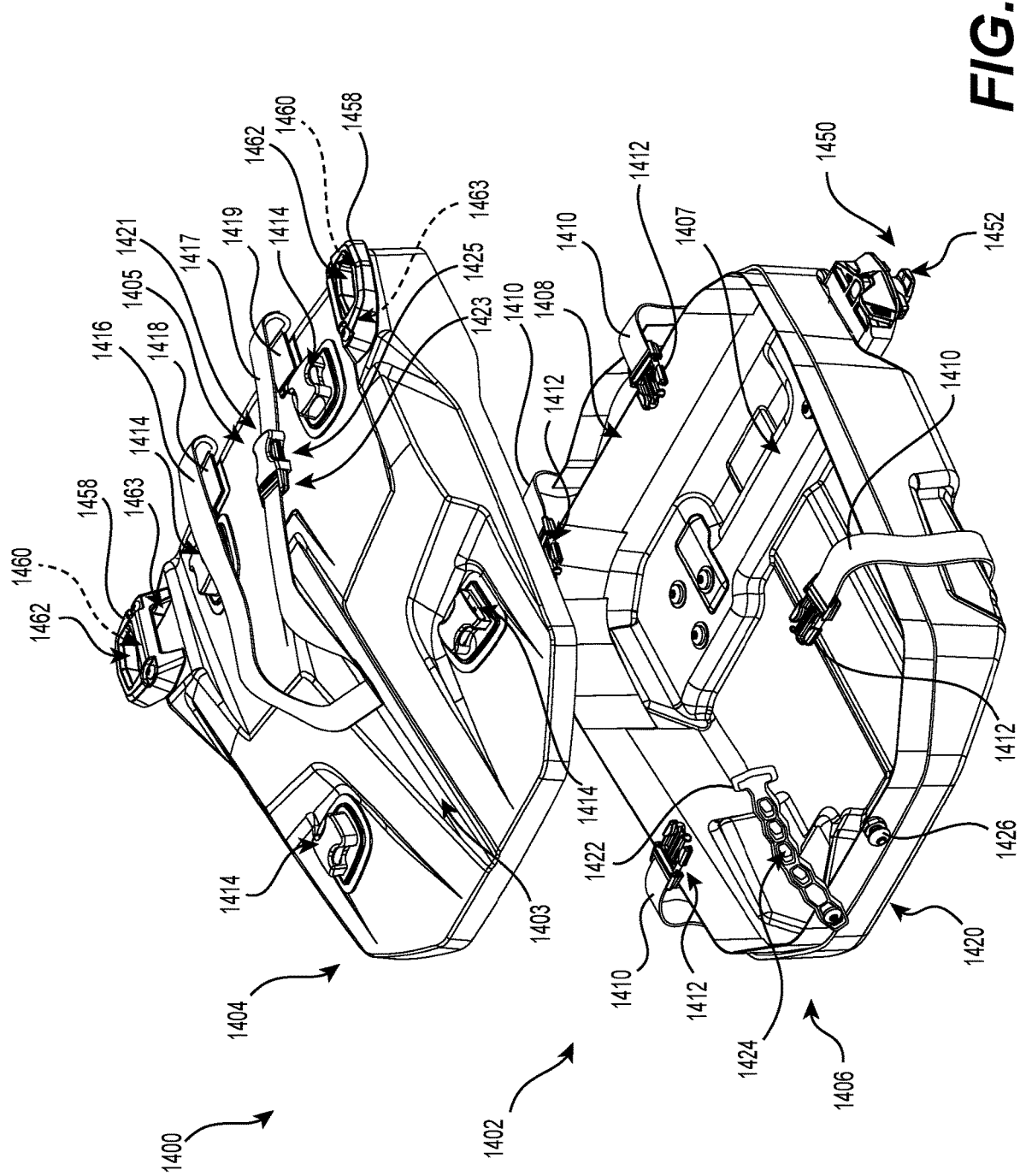
FIG. 14 is a perspective view, taken from a rear, right side, of the bag for the snowmobile of FIG. 1.

In another implementation of the present technology, with reference to FIG. 14, there is provided a bag 1400 for the snowmobile 10 (see FIG. 1). The bag 1400 has a body 1402 for containing clothing or other gear of the rider. The body 1402 has a top portion 1404 and a bottom portion 1406 which define a storage space 1408 therebetween where the clothing or the other gear can be contained. The top portion 1404 and the bottom portion 1406 are rigid in this implementation, however, this may not be the case in each and every implementation of the present technology.

The top portion 1404 is adapted for selectively and removably connecting the flap 102 (see FIG. 1) on top of the top portion 1404. To that end, the top portion 1404 has two connection bodies 1458 attached on opposite sides of the lateral center of the top portion 1404. The connection bodies 1458 have a structure and operate similarly to how the connection bodies 858 depicted in FIG. 1 are structured and operate. Each of the connection bodies 1458 has a cavity 1460 as well as an aperture 1462 at the top thereof and an inwardly facing lateral aperture 1463 where both the aperture 1462 and the inwardly facing lateral aperture 1463 provide a passage to the respective cavity 1460. The lateral distance separating the connection bodies 1458 attached to the top portion 1404 is the same as the lateral distance separating the connection bodies 858 attached on top of the tunnel 18. The lateral distance separating the apertures 1462 of the connection bodies 1458 is the same as the lateral distance separating the apertures 862 of the connection bodies 858 and is the same as the lateral distance separating the anchors 806 of the toolless fasteners 850 (see FIGS. 5, 12 and 13 for example). It is contemplated that the connection bodies 1458 and the top portion 1404 could be integrally formed. The top portion 1404 may also selectively and removably connect the flap 1202 (see FIG. 12) or the flap 1302 (see FIG. 13) instead of the flap 102.

The top portion 1404 defines a generally flat surface 1405 near the front thereof. The top portion 1404 also defines a chevron-shaped recess 1403 that longitudinally extends from the flat surface 1405 to the rear of the top portion 1404 where the chevron-shaped recess 1403 is tapered. The recess 1403 is equidistant from the lateral sides of the top portion 1404.

Figure 15:
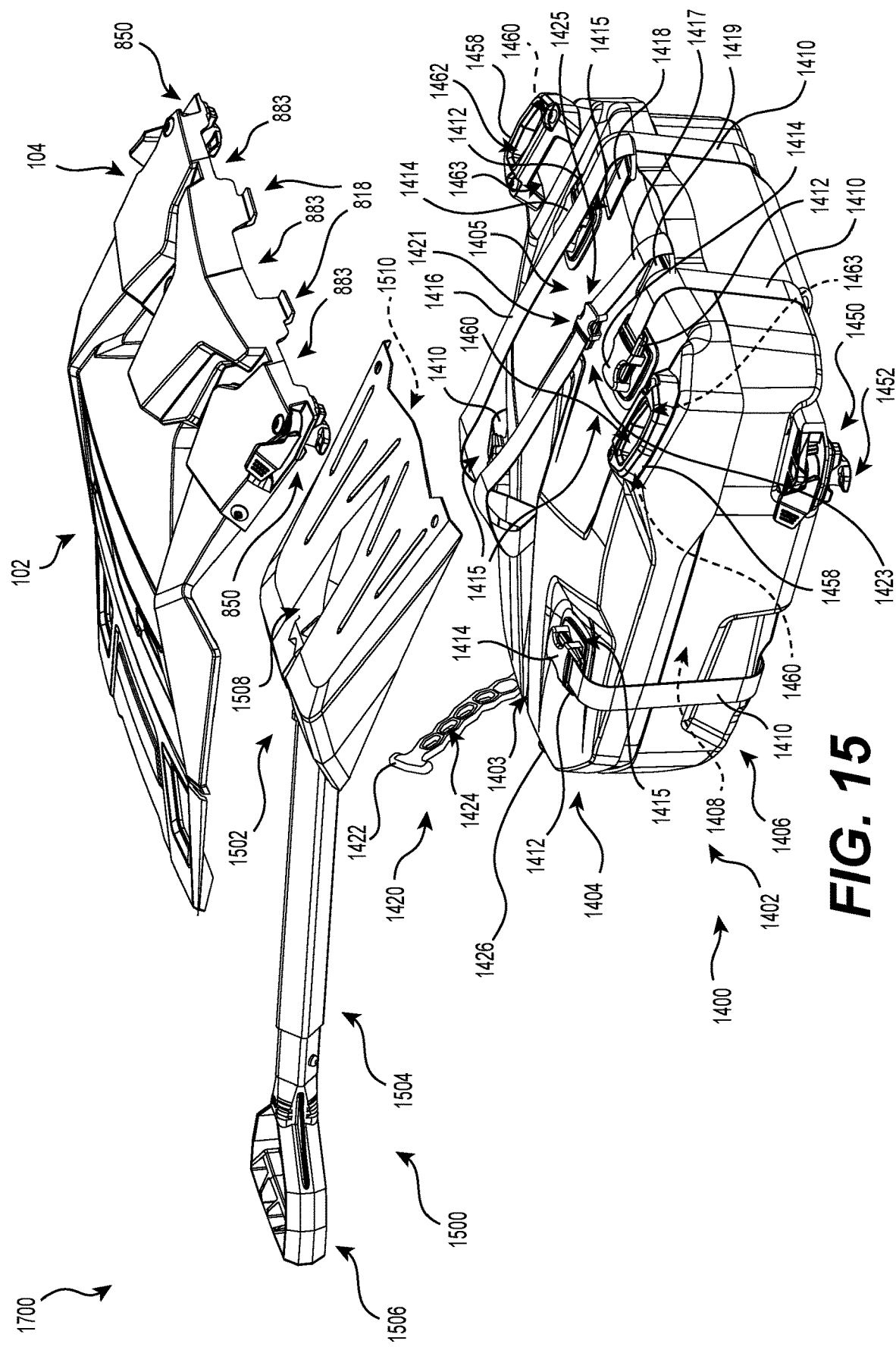
FIG. 15 is a perspective view, taken from a front, right side, of a snowmobile accessory assembly in a disconnected configuration.

The top portion 1404 also has straps 1416 and 1417 as well as a snap-fit buckle assembly 1421 for retaining a shovel 1500 (see FIG. 15). The strap 1416 is removably connected by a connection element 1418 at one end thereof to the top portion 1404 near the front of the top portion 1404. The strap 1416 is connected at the other end thereof to a first buckle member 1423 of the buckle assembly 1421. The strap 1417 is removably connected by a connection element 1419 at one end thereof to the top portion 1404 near the front of the top portion 1404. The strap 1417 is connected at the other end thereof to a second buckle member 1425 of the buckle assembly 1421. The buckle assembly 1421 allows for a selective connection between the ends of the straps 1416 and 1417. The strap 1416 is longer than the strap 1417. In the present implementation, the connection elements 1418 and 1419 are hook and loop fasteners, but other types of fasteners are contemplated. It is also contemplated, that the straps 1416 and 1417 could be permanently connected to the top portion 1404.

It is contemplated that the first buckle member 1423 could be connected to the other end of the strap 1417 while the second buckle member 1425 can be connected to the other end of the strap 1416. Alternatively, the strap 1417 could be longer than the strap 1416.

Figure 20:
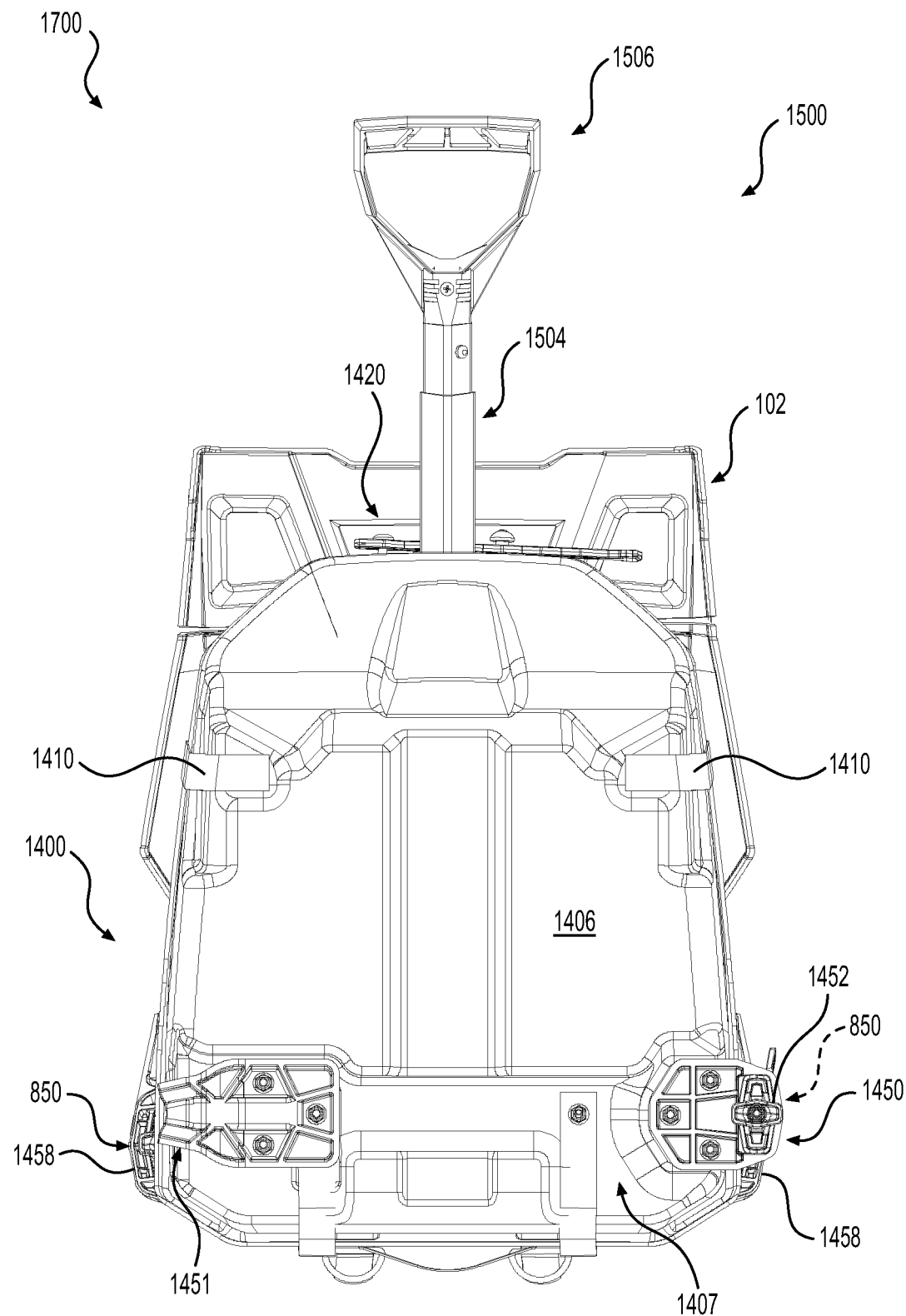
FIG. 20 is a bottom plan view of the snowmobile accessory assembly of FIG. 17.

As best seen in FIG. 20, the bottom portion 1406 defines a channel-shaped recess 1407 extending laterally across the bottom of the bottom portion 1406. The channel-shaped recess 1407 provides room for attaching a toolless fastener 1450 and an outwardly extending toe 1451 on opposite sides of the lateral center of the bottom portion 1406. The toolless fastener 1450 has a structure and operates similarly to how the toolless fasteners 850, depicted in FIG. 2, of the flap assembly 100 are structured and operate. The toolless fastener 1450 has an anchor 1452 similarly to how each of the toolless fasteners 850 has the respective anchor 806. The lateral distance separating the anchor 1452 of toolless fastener 1450 and the toe 1451 attached to the bottom portion 1406 is such that it allows connecting the bag 1400 of FIG. 20 to the connection bodies 858 by the toolless fastener 1450 and the toe 1451 in lieu of connecting the flap assembly 100 to the connection bodies 858 by the toolless fasteners 850. The toolless fastener 1450 and the toe 1451 of the bottom portion 1406 allow for a selective and removable connection between the tunnel 18 and the bottom portion 1406.

It is contemplated that the toolless fastener 1450 could be attached on a left side of the lateral center of the bottom portion 1406 while the toe 1451 could be attached on a right side of the lateral center of the bottom portion 1406.

Figure 21:
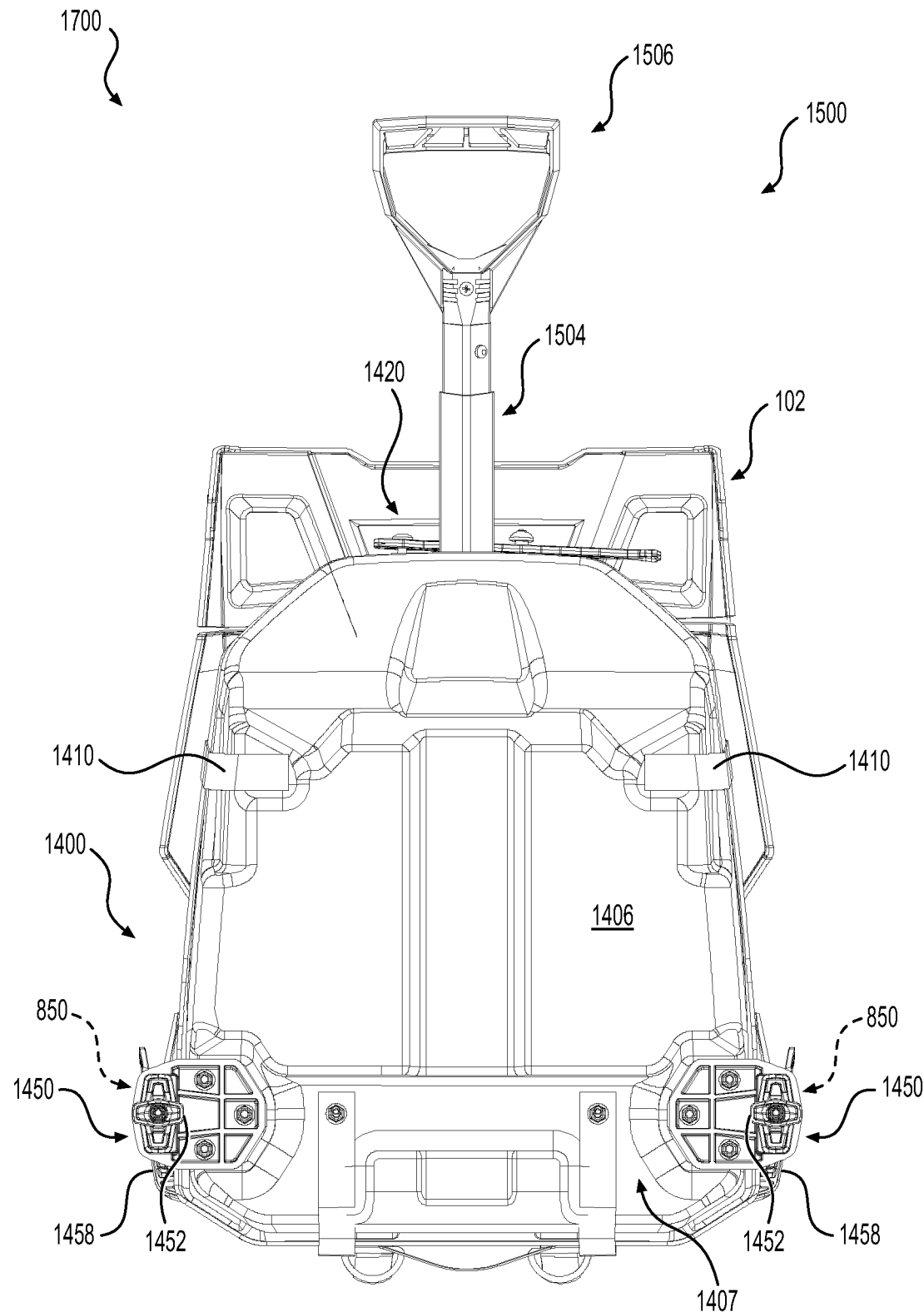
FIG. 21 is a bottom plan view of the snowmobile accessory assembly according to another implementation of the present technology.

In an alternative implementation, with reference to FIG. 21, the channel-shaped recess 1407 may provide room for attaching a second toolless fastener 1450 instead of the toe 1451. The lateral distance separating the two toolless fasteners 1450 attached to the bottom portion 1406 is the same as the lateral distance separating the toolless fasteners 850 of the flap assembly 100 (see FIG. 5 for example). The lateral distance separating the anchors 1452 of the toolless fasteners 1450 is the same as the lateral distance separating the anchors 806 of the toolless fasteners 850 and the same as the lateral distance separating the apertures 862 of the connection bodies 858. Therefore, the lateral distance separating the anchors 1452 of the two toolless fasteners 1450 is such that it allows connecting the bag 1400 of FIG. 21 to the connection bodies 858 by the two toolless fasteners 1450 in lieu of connecting the flap assembly 100 to the connection bodies 858 by the toolless fasteners 850. The two toolless fasteners 1450 of the bottom portion 1406 allow for a selective and removable connection between the tunnel 18 and the bottom portion 1406. The two toolless fasteners 1450 of the bottom portion 1406 can selectively and removably connect the bottom portion 1406 on top of the tunnel 18 similarly to how the toolless fasteners 850 can selectively and removably connect the flap 102 on top of the tunnel 18.

Returning to the description of FIG. 14, the bottom portion 1406 is also provided with a retaining assembly 1420 at the rear of the bottom portion 1406 for selectively and removably retaining the shovel 1500 (see FIG. 15). The retaining assembly 1420 has a retention member 1422 defining a plurality of apertures 1424 and is attached at one end thereof at the rear of the bottom portion 1406. The retaining assembly 1420 also has a knob 1426 for being received in any one of the plurality of apertures 1424 and thereby for cooperating with the retention member 1422 for retaining the shovel 1500 as will be further described herein below.

The top portion 1404 is selectively connectable to the bottom portion 1406 by four snap-fit buckle assemblies 1415, as best seen in FIG. 15. It is contemplated that other types of buckle assemblies can be used for selectively connecting the bottom portion 1406 to the top portion 1404.

Each one of the four buckle assemblies 1415 has a top buckle member 1414 attached on top of the top portion 1404 and a bottom buckle member 1412 connected by a respective strap 1410 to the bottom portion 1406. Two of the top buckle members 1414 are attached on opposite sides of the lateral center of the top portion 1404 near a rear thereof such that they face laterally away from the bag 1400 and away from one another. Two other top buckle members 1414 are attached on opposite sides of the lateral center of the top portion 1404 near a front thereof such that they face forwardly away from the bag 1400.

As seen in FIG. 15, when the top portion 1404 is positioned over the bottom portion 1406, the rider inserts the bottom buckle members 1412 into the respective top buckle members 1414. The top and bottom buckle members 1414 and 1412 of each respective buckle assembly 1415 cooperate in order to selectively connect the top portion 1404 to the bottom portion 1406.

It is also contemplated that the top and the bottom portions 1404 and 1406 may be integrally formed. In implementations where the top and the bottom portions 1404 and 1406 are integrally formed, the buckle assemblies 1415 may be omitted and the body 1402 of the bag 1400 can have an opening for providing access to the storage space 1408 defined between the top and the bottom portions 1404 and 1406.

Alternatively, the top portion 1404 and the bottom portion 1406 could be connected with snaps, hook and loop fasteners, slide fasteners or other suitable fasteners without departing from the scope of the present technology. It is contemplated that the top portion 1404 could be hinged along one side to the bottom portion 1406.

Figure 16:
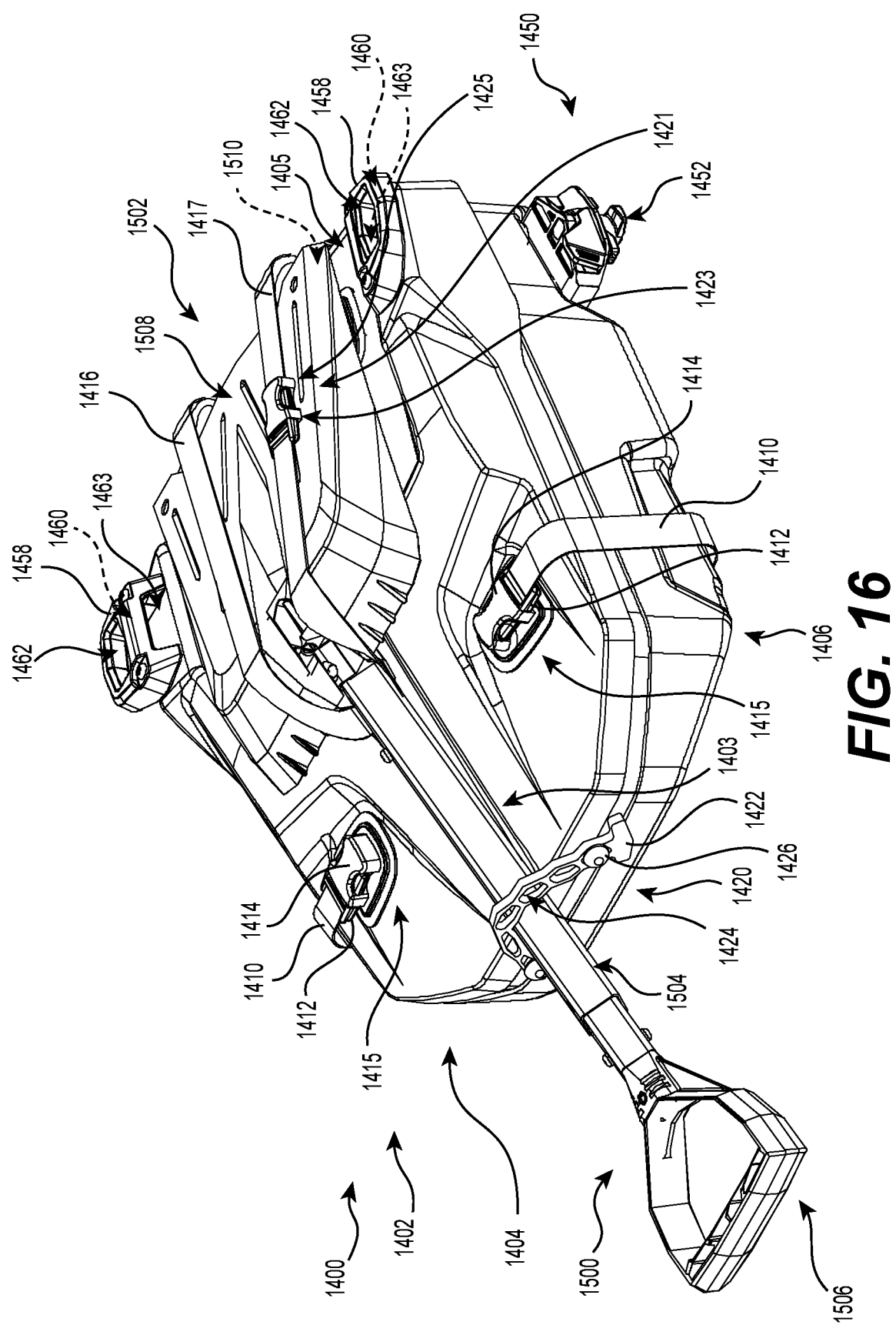
FIG. 16 is a perspective view, taken from a rear, right side of the bag with the shovel being selectively and removably retained thereby.

As best seen in FIG. 15, the shovel 1500 has a blade 1502, a telescopic shaft 1504 attached at one end to the blade 1502 and at the other end to a handle 1506. The blade 1502 has a shoveling side 1510 and a resting side 1508. The top portion 1404 is adapted for selectively and removably retaining the shovel 1500 on top of the top portion 1404 such as depicted in FIG. 16. The shape of the flat surface 1405 generally corresponds to a shape of the contour of the blade 1502.

In order to selectively and removably retain the shovel 1500 on top of the top portion 1404, as best seen in FIG. 16, the rider abuts the blade 1502 against the flat surface 1405 of the top portion 1404 such that the shoveling side 1510 faces generally downwards and generally towards the flat surface 1405. The rider passes the strap 1416 over the resting side 1508 on one side of the shaft 1504, then under the shaft 1504 and then over the resting side 1508 on the other side of the shaft 1504. The rider passes the strap 1417 over the resting side 1508 on the other side of the shaft 1504 and engages the first buckle member 1423 with the second buckle member 1425. The strap 1416, the strap 1417, the first buckle member 1423 and the second buckle member 1425 cooperate in order to selectively and removably retain the shovel 1500 on top of the top portion 1404. When the straps 1416 and 1417 as well as the buckle assembly 1421 so-cooperate, the shaft 1504 is partially received by the recess 1403 and a portion of the strap 1416 is sandwiched between the shaft 1504 and the top portion 1404.

It is contemplated that the buckle assembly 1421 could be adapted for allowing tightening of at least one of the straps 1416 and 1417 about the shovel 1500. Alternatively, the straps 1416 and 1417 as well as the buckle assembly 1421 could cooperate for selectively and removably retaining other gear of the rider, instead of the shovel 1500.

In addition to the shovel 1500 being selectively and removably retained by the top portion 1404, the shovel 1500 is also selectively and removably retained by the retaining assembly 1420 of the bottom portion 1406. When the blade 1502 is abutted against the flat surface 1405 and the shaft 1504 is partially received by the recess 1403, the rider passes the retention member 1422 over the shaft 1504 and inserts the knob 1426 into a given one of the plurality of apertures 1424. When the retention member 1422 is passed over the shaft 1504 and the knob 1426 is inserted into the given one of the plurality of apertures 1424, the retention member 1422 is under tension and thereby exerts a generally downward force on the shaft 1504 which retains the shovel 1500 in position.

The retaining assembly 1420 of the bottom portion 1406, in combination with the strap 1416 and the recess 1403 of the top portion 1404, selectively and removably retains the shovel 1500 on top of the top portion 1404.

Figure 17:
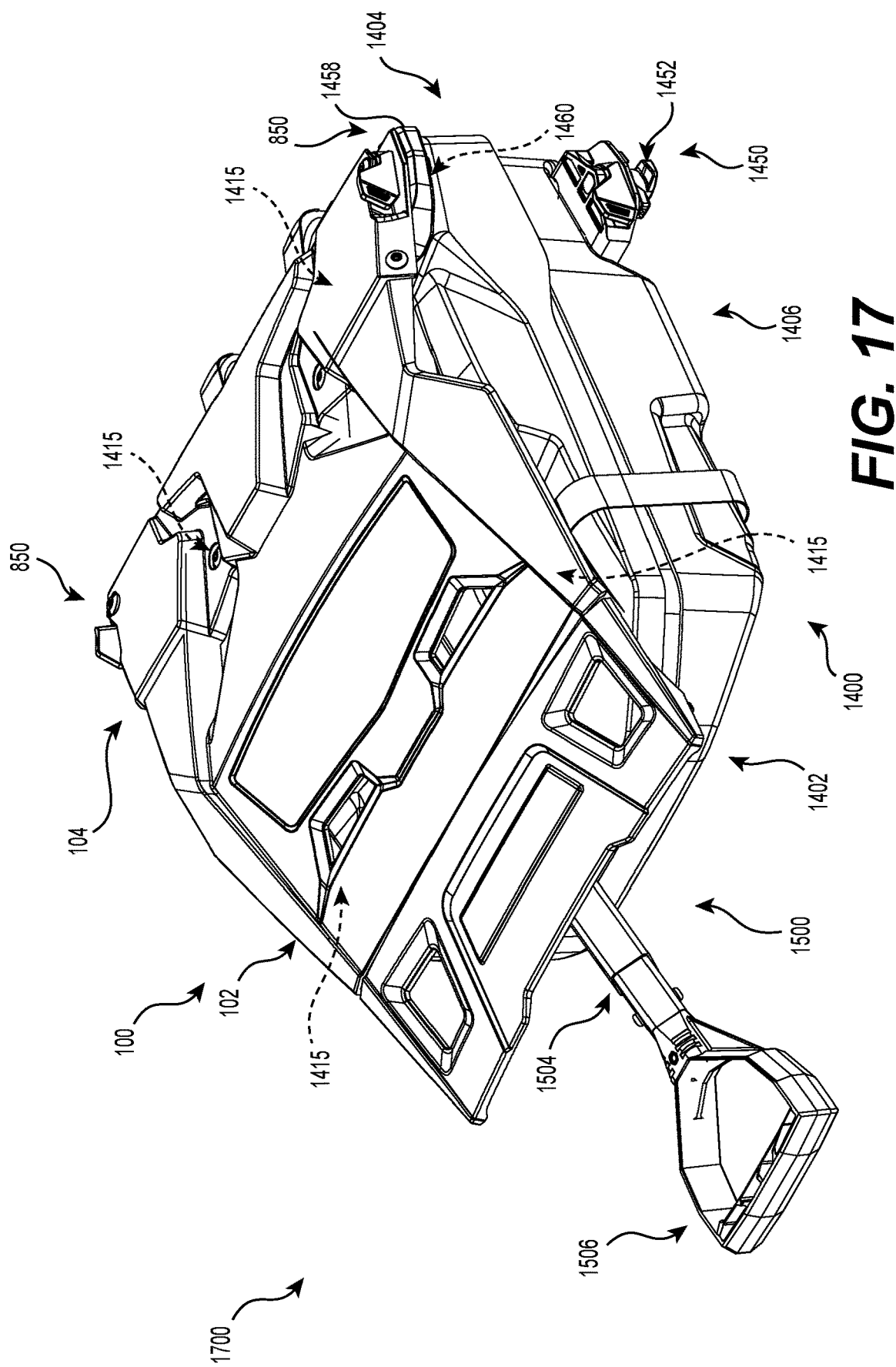
FIG. 17 is a perspective view, taken from a rear, right side of the snowmobile accessory assembly of FIG. 15 with all the elements connected together.

With reference to FIG. 17, in one implementation, the bag 1400, the shovel 1500 and the flap assembly 100 together form a snowmobile accessory assembly 1700.

With this assembly 1700, when the flap 102 is not connected to the rear portion of the tunnel 18, the rider can connect the flap 102 on top of the top portion 1404 by the toolless fasteners 850 of the flap assembly 100. More specifically, the toolless fasteners 850 of the linking body 104 cooperate with the connection bodies 1458 of the top portion 1404 for selectively and removably connecting the flap 102 on top of the top portion 1404. When the flap 102 is selectively and removably connected on top of the top portion 1404, the shovel 1500 is partially located between the flap 102 and the top portion 1404.

Alternatively, the shovel 1500 may be omitted, in which case, when the flap 102 is not connected to the rear portion of the tunnel 18, the rider can connect the flap 102 on top of the top portion 1404 by the toolless fasteners 850 of the flap assembly 100, without the shovel 1500 being partially located between the flap 102 and the top portion 1404.

Accordingly, with the components of the snowmobile accessory assembly 1700, when the flap 102 is not connected to the rear of the tunnel 18, the rider has the option of connecting the flap 102 directly on top of the tunnel 18 as shown in FIGS. 4 and 5 if the bag 1400 and the shovel 1500 are not provided on the tunnel 18, or the rider can connect the bag 1400 to the tunnel 18 and the flap 102 on top of the bag 1400, with or without the shovel 1500, as described above.

It is contemplated that the snowmobile accessory assembly 1700 may have, instead of the flap assembly 100, the flap assembly 1200 (see FIG. 12) or the flap assembly 1300 (see FIG. 13).

Figure 18:
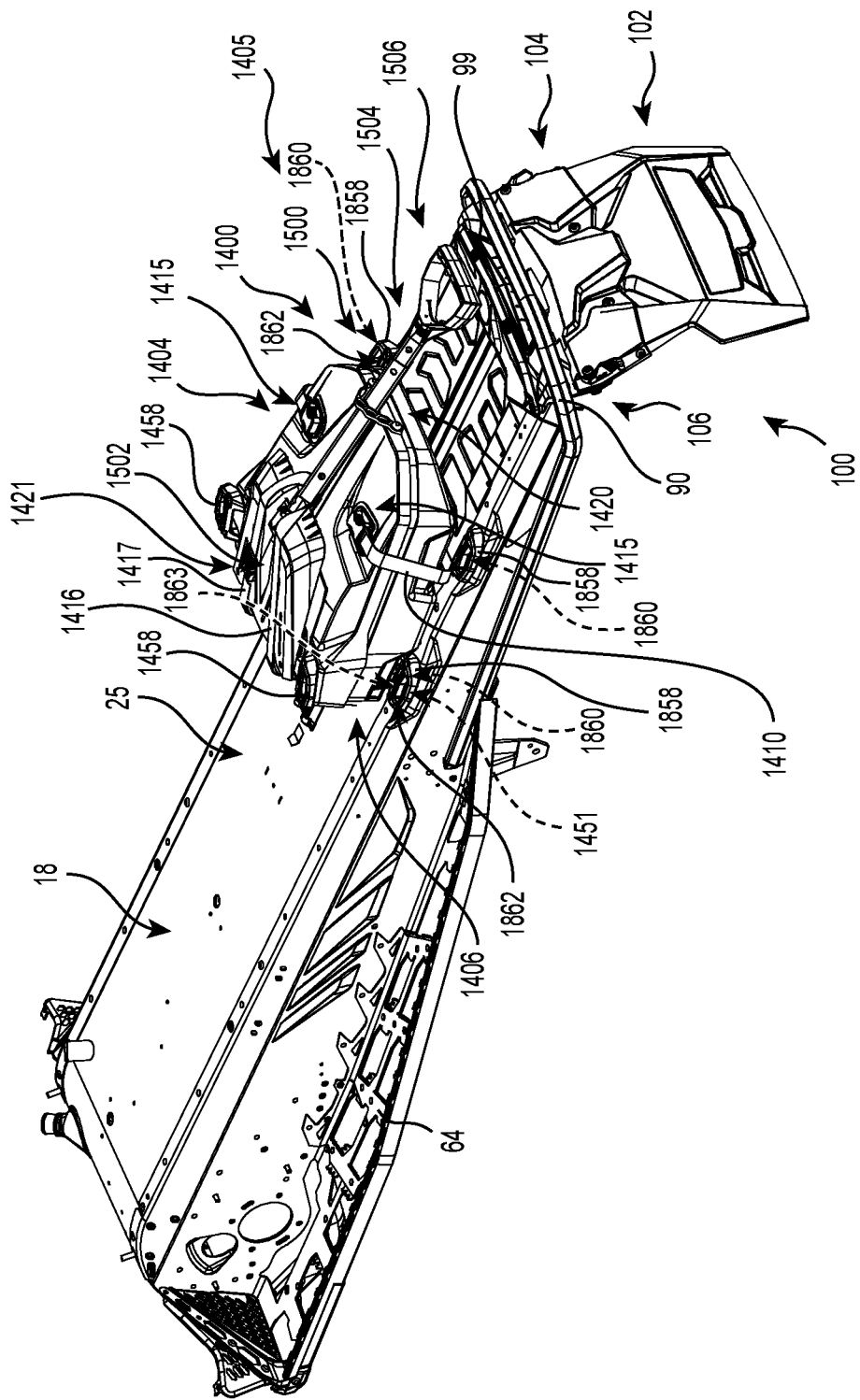
FIG. 18 is a perspective view, taken from a rear, left side, of the tunnel according to another implementation of the present technology with the bag and the shovel of FIG. 16 being connected on top thereof.

With reference to FIG. 18, there is depicted an alternative implementation of the tunnel 18 of the snowmobile 10 which has four connection bodies 1858 fastened thereto, instead of two connection bodies 858 as in the embodiment of the tunnel 18 depicted in FIG. 2. The connection bodies 1858 have a structure and operate similarly to how the connection bodies 858 are structured and operate. Each of the connection bodies 1858 has a cavity 1860 as well as an aperture 1862 at the top thereof and an inwardly facing lateral aperture 1863 where both the aperture 1862 and the inwardly facing lateral aperture 1863 provide a passage to the respective cavity 1860. The four connection bodies 1858 include two pairs, a front pair and a rear pair, of connection bodies 1858 where each pair has a respective connection body 1858 on each of the opposite sides of the lateral center of the tunnel 18 depicted in FIG. 18.

As depicted in FIG. 18, in order to selectively and removably connect the bag 1400 on top of the tunnel 18, the rider begins by inserting the toe 1451 of the bag 1400 into the inwardly facing lateral aperture 1863 of a left one of the front pair of the connection bodies 1858. The toe 1451 and the inwardly facing lateral aperture 1863 of the left one of the front pair of the connection bodies 1858 aid in aligning the bag 1400 with the tunnel 18. When the toe 1451 is inserted in the inwardly facing lateral aperture 1863 of the left one of the front pair of the connection bodies 1858, the rider pivots the bag 1400 towards a right one of the front pair of the connection bodies 1858. The rider then operates the toolless fastener 1450 of the bag 1400 so that the toolless fastener 1450 cooperates with the right one of the front pair of the connection bodies 1858 thereby selectively and removably connecting the bag 1400 in a first position on top of the tunnel 18. The rider operates the toolless fastener 1450 of the bag 1400 for selectively and removably connecting the bag 1400 to the tunnel 18 similarly to how the rider can operate the toolless fasteners 850 of the flap assembly 100 for selectively and removably connecting the flap 102 on top of the tunnel 18. When the bag 1400 is selectively and removably connected on top of the tunnel 18 in the first position, the retaining assembly 1420 of the bag 1400 faces rearward.

It is contemplated that the toe 1451 can cooperate with the right one of the front pair of the connection bodies 1858, similarly to how the toe 1451 cooperates with the left one of the front pair of the connection bodies 1858, while the toolless fastener 1450 can cooperate with the left one of the front pair of the connection bodies 1858, similarly to how the toolless fastener 1450 cooperates with the right one of the front pair of the connection bodies 1858. When the toe 1451 cooperates with the right one of the front pair of the connection bodies 1858 and when the toolless fastener 1450 cooperates with the left one of the front pair of the connection bodies 1858, the bag 1400 can be selectively and removably connected to the top of the tunnel 18 in a second position. When the bag 1400 is selectively and removably connected on top of the tunnel 18 in the second position, the retaining assembly 1420 of the bag 1400 faces forward.

When the bag 1400 is selectively and removably connected to the top of the tunnel 18 in the first or the second position, the rider can operate the toolless fasteners 850 of the flap assembly 100 for selectively and removably connecting the flap 102 to the rear pair of the connection bodies 1858.

It is contemplated that each one of the toe 1451 and the toolless fastener 1450 could cooperate with each one of the rear pair of the connection bodies 1858 similarly to how each one of the toe 1451 and the toolless fastener 1450 cooperate with each one of the front pair of the connection bodies 1858. Therefore, each one of the toe 1451 and the toolless fastener 1450 can cooperate with each one of the rear pair of the connection bodies 1858 such that the bag 1400 can be selectively and removably connected to the top of the tunnel 18 in a third or a fourth position. When the bag 1400 is selectively and removably connected on top of the tunnel 18 in the third position, the retaining assembly 1420 of the bag 1400 faces rearward. When the bag 1400 is selectively and removably connected on top of the tunnel 18 in the fourth position, the retaining assembly 1420 of the bag 1400 faces forward.

When the bag 1400 is selectively and removably connected to the top of the tunnel 18 in the third or the fourth position, the rider can operate the toolless fasteners 850 of the flap assembly 100 for selectively and removably connecting the flap 102 to the front pair of the connection bodies 1858.

In the alternative implementation of the bag 1400 where the bag 1400 has the two toolless fasteners 1450 (see FIG. 21), each one of the toolless fasteners 1450 of the bag 1400 can cooperate with each one of the front pair of the connection bodies 1858 depicted in FIG. 18 thereby selectively and removably connecting the bag 1400 in the first or the second position on top of the tunnel 18. In this alternative implementation, each one of the two toolless fasteners 1450 of the bag 1400 can also cooperate with each one of the rear pair of the connection bodies 1858 depicted in FIG. 18 for selectively and removably connecting the bag 1400 in the third or the fourth position on top of the tunnel 18. In this alternative implementation, the rider can operate the two toolless fasteners 1450 of the bag 1400 for selectively and removably connecting the bag 1400 to the tunnel 18 similarly to how the rider can operate the toolless fasteners 850 of the flap assembly 100 for selectively and removably connecting the flap 102 on top of the tunnel 18.

The lateral distance separating the apertures 1862 of the front pair of connection bodies 1858 is the same as (i) the lateral distance separating the anchors 806 of the toolless fasteners 850 of the flap assembly 100 (see FIG. 5 for example) and (ii) the lateral distance separating the anchors 1452 of the toolless fasteners 1450 of the bag 1400 depicted in FIG. 21. Therefore, the lateral distance separating the apertures 1862 of the front pair of connection bodies 1858 is such that it allows for connection with either of (i) the two toolless fasters 850 of the flap assembly 100 and (ii) the two toolless fasteners 1450 of the bag 1400 depicted in FIG. 21.

It should be noted that the lateral distance separating the anchor 1452 of the toolless fastener 1450 and the toe 1451 of the bag 1400 depicted in FIG. 20 is shorter than the lateral distance separating the inwardly facing lateral aperture 1863 of one of the front pair of connection bodies 1858 and the aperture 1862 of the other one of the front pair of connection bodies 1858 so as to allow for connection of the bag 1400 of FIG. 20 with the front pair of connection bodies 1858.

The lateral distance separating the apertures 1862 of the rear pair of connection bodies 1858 is the same as the lateral distance separating the apertures 1862 of the front pair of connection bodies 1858. Also, the lateral distance separating the inwardly facing lateral apertures 1863 of the rear pair of connection bodies 1858 is the same as the lateral distance separating the inwardly facing lateral aperture 1863 of the front pair of connection bodies 1858.

Figure 19:
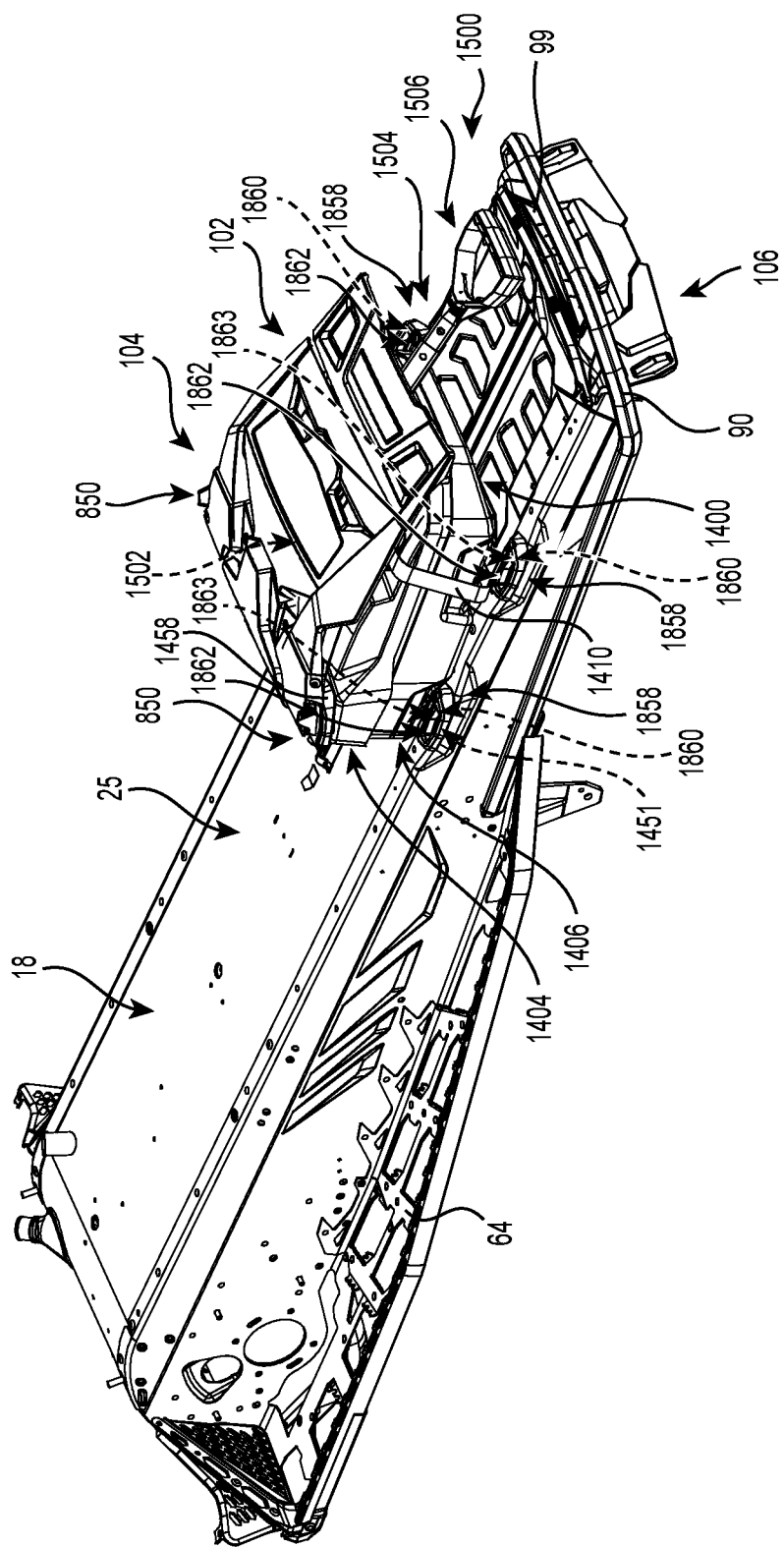
FIG. 19 is a perspective view, taken from a rear, left side, of the tunnel of FIG. 18 with the snowmobile accessory assembly of FIG. 17 connected on top thereof.

With reference to FIG. 19, the rider disconnects the flap 102 from the rear portion of the tunnel 18 of FIG. 18 and selectively and removably connects the flap 102 to the bag 1400. The flap 102 is selectively and removably connected to the bag 1400 by the toolless fasteners 850 of the flap assembly 100. The toolless fasteners 850 of the flap assembly 100 cooperate with the connection bodies 1458 of the top portion 1404 of the bag 1400 thereby selectively and removably connecting the flap 102 on top of the top portion 1404. The rider operates the toolless fasteners 850 of the flap assembly 100 for selectively and removably connecting the flap 102 to the bag 1400 similarly to how the rider can operate the toolless fasteners 850 of the flap assembly 100 for selectively and removably connecting the flap 102 on top of the tunnel 18.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. A snowmobile comprising:
   a frame having a longitudinally extending tunnel;
   a steering assembly operatively connected to the frame;
   at least one ski operatively connected to the frame and to the steering assembly;
   an endless drive track operatively connected to the frame;
   a motor supported by the frame, the motor being operatively connected to the steering assembly and to the endless drive track for propelling the snowmobile;
   a straddle-type seat disposed above the tunnel and adapted to accommodate a rider; and
   a flap assembly having:
      a flap;
      a mounting body connected to a rear portion of the tunnel; and
      at least one toolless fastener extending generally longitudinally and selectively connecting the flap to the mounting body, the at least one toolless fastener being adapted for selectively and removably connecting the flap to the snowmobile in any one of at least two distinct positions on the snowmobile, such that the at least one toolless fastener is adapted for selectively and removably connecting the flap to:
         (i) the mounting body in at least one of the at least two distinct positions on the snowmobile, and
         (ii) a top side of the tunnel in at least one other of the at least two distinct positions on the snowmobile.

2. The snowmobile of claim 1, wherein the at least one toolless fastener includes at least one anchor selectively cooperating with at least one aperture defined in the mounting body to connect the flap to the mounting body.

3. The snowmobile of claim 2, wherein the at least one anchor is selectively pivoted about a generally longitudinal axis for cooperating with the at least one aperture.

4. The snowmobile of claim 1, wherein:
   the flap assembly further comprises a linking body;
   the flap is connected to the linking body; and
   the at least one toolless fastener selectively connects the linking body to the mounting body.

5. The snowmobile of claim 4, wherein the linking body has inner recesses, the flap being at least partially inserted in the inner recesses.

6. The snowmobile of claim 4, wherein the flap is fastened to the linking body.

7. The snowmobile of claim 4, wherein:
   one of the linking body and the mounting body has at least one tongue;
   an other one of the linking body and the mounting body defines at least one groove; and
   the at least one tongue is received in the at least one groove when the linking body is connected to the mounting body.

8. The snowmobile of claim 1, wherein the flap extends at least partially rearward of the tunnel when the flap is connected to the top side of the tunnel.

9. The snowmobile of claim 1, wherein the at least one toolless fastener is two toolless fasteners selectively connecting the flap to opposite sides of a lateral center of the mounting body.

10. A flap assembly kit for a snowmobile, the kit comprising:
    a mounting body adapted for connecting to a rear portion of the snowmobile;
    a linking body adapted for connecting to a flap; and
    at least one toolless fastener selectively connecting the linking body to the mounting body.

11. The kit of claim 10, wherein the at least one toolless fastener includes at least one anchor adapted for selectively cooperating with at least one aperture defined in one of the linking body and the mounting body to connect the linking body to the mounting body.

12. The kit of claim 10, further comprising the flap connected to the linking body.

13. A snow-flap assembly for a snowmobile comprising:
    a snow-flap; and
    at least one toolless fastener connected to the snow-flap and being adapted for selectively and removably connecting the snow-flap to the snowmobile in at least two distinct positions on the snowmobile,
    the at least two distinct positions comprising a guard position of the snow-flap and a stored position of the snow-flap,
    when connected to the snowmobile in the stored position, the snow-flap being selectively and removably connected to a top side of the tunnel, and
    when connected to the snowmobile in the guard position, the snow-flap extending at least partially downward of the tunnel.

14. The snow-flap assembly of claim 13, wherein the snow-flap assembly further comprises a mounting body adapted for connecting to a rear portion of a tunnel of the snowmobile, the at least one toolless fastener being adapted for selectively and removably connecting the snow-flap to the mounting body in at least one of the at least two distinct positions.

15. The snow-flap assembly of claim 14, wherein when the snow-flap is connected to the snowmobile in the guard position, the snow-flap is selectively and removably connected to the mounting body.

16. The snow-flap assembly of claim 15, wherein
    when the snow-flap is connected to the snowmobile in the stored position, the snow-flap extends above the tunnel.

17. A snow-flap assembly for a snowmobile comprising:
    a snow-flap; and
    at least one toolless fastener connected to the snow-flap and being adapted for selectively and removably connecting the snow-flap to the snowmobile in at least two distinct positions on the snowmobile,
    the at least two distinct positions comprising a guard position of the snow-flap and a position on top of a bag of the snowmobile,
    the bag comprising a body having a top portion and a bottom portion defining a storage space therebetween, the top portion being connected to the bottom portion, the top portion being adapted for cooperating with the at least one toolless fastener of the snow-flap assembly, the bottom portion having at least one other toolless fastener selectively and removably connecting the bottom portion to a rear portion of the snowmobile, when connected to the snowmobile in the guard position, the snow-flap extending at least partially downward of the tunnel.

\* \* \* \* \*